US011038895B2

(12) United States Patent
Bartfai-Walcott et al.

(10) Patent No.: US 11,038,895 B2
(45) Date of Patent: Jun. 15, 2021

(54) TRUST MANAGEMENT MECHANISMS

(71) Applicant: Intel Corporation, Santa Clara, CA (US)

(72) Inventors: Katalin Bartfai-Walcott, El Dorado Hills, CA (US); John Walcott, El Dorado Hills, CA (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 16/147,335

(22) Filed: Sep. 28, 2018

(65) Prior Publication Data
US 2019/0044949 A1 Feb. 7, 2019

(51) Int. Cl.
| | | |
|---|---|---|
| H04L 29/06 | (2006.01) |
| H04W 12/06 | (2021.01) |
| H04L 29/08 | (2006.01) |
| H04W 12/00 | (2021.01) |
| H04W 12/63 | (2021.01) |
| H04W 12/60 | (2021.01) |
| H04W 4/70 | (2018.01) |
| H04W 12/71 | (2021.01) |

(52) U.S. Cl.
CPC ........ *H04L 63/105* (2013.01); *H04L 65/1036* (2013.01); *H04L 67/10* (2013.01); *H04W 12/009* (2019.01); *H04W 12/06* (2013.01); *H04W 12/63* (2021.01); *H04W 12/66* (2021.01); *H04W 4/70* (2018.02); *H04W 12/71* (2021.01)

(58) Field of Classification Search
None
See application file for complete search history.

(56) References Cited

U.S. PATENT DOCUMENTS

| | | | |
|---|---|---|---|
| 7,737,878 B2 | 6/2010 | van Tooren et al. |
| 9,852,554 B2 | 12/2017 | Nix |

(Continued)

OTHER PUBLICATIONS

Orhio Mark Credo et al., An Explicit Trust Model Towards Better Syste Security, The Fourth International Conference on Computer Science and Information Technology, pp. 139-151 (2014). Accessed at: https://arxiv.org/ftp/arxiv/papers/1403/1403.0282.pdf.

(Continued)

*Primary Examiner* — Saad Khawar
(74) *Attorney, Agent, or Firm* — Schwabe, Williamson & Wyatt, P.C.

(57) ABSTRACT

Systems, methods, and computer-readable media are provided for managing mutual and transitive trust relationships between resources, such as Fog/Edge nodes, autonomous devices (e.g., IoT devices), and/or analog/biological resources to provide collaborative, trusted communication over a network for service delivery. Disclosed embodiments include a subject resource configured to assign an observed resource to a trust zone based on situational and contextual information. The situational information may indicate a vector of the observed resource with respect to the subject resource. The contextual information may be based in part on whether a relationship exists between the subject resource and the observed resource. The subject resource is configured to determine a trust level of the observed resource based on the determined trust zone. Other embodiments are disclosed and/or claimed.

30 Claims, 11 Drawing Sheets

(56) References Cited

U.S. PATENT DOCUMENTS

| | | | |
|---|---|---|---|
| 2015/0072704 A1* | 3/2015 | Colby | H04W 4/023 455/456.1 |
| 2015/0130618 A1* | 5/2015 | Hamminga | F03D 17/00 340/573.2 |
| 2016/0239798 A1 | 8/2016 | Borley et al. | |
| 2017/0032673 A1* | 2/2017 | Scofield | G06F 16/29 |
| 2017/0092138 A1 | 3/2017 | Trundle et al. | |
| 2017/0104746 A1* | 4/2017 | Nair | G06F 21/31 |
| 2017/0263128 A1* | 9/2017 | Chandran | G08G 1/0175 |
| 2017/0272450 A1* | 9/2017 | Krishnamurthi | H04W 4/023 |
| 2018/0061237 A1 | 3/2018 | Erickson et al. | |
| 2019/0068582 A1* | 2/2019 | Kim | H04W 4/027 |
| 2019/0087668 A1* | 3/2019 | Kim | G06K 9/6274 |
| 2019/0202450 A1* | 7/2019 | Maeda | B60W 30/09 |
| 2019/0230303 A1* | 7/2019 | Wang | G06K 9/3233 |

OTHER PUBLICATIONS

Orhio Mark Credo et al., "The Ideal Computing System Framework—A Novel Security Paradigm", May 2014, 10 pages., The SIJ Transactions on Computer Science Engineering & its Applications (CSEA), vol. 2, No. 3.

Tuva Selstad Dybedokken, "Trust Management in Fog Computing", Jun. 2017, 106 pages, Norwegian University of Science and Technology.

Entrust Whitepaper "The Concept of Trust in Network Security", Aug. 2000, 8 pages, version 1.2; https://www.entrust.com/wp-content/uploads/2000/08/trust.pdf.

K. Gokulnath et al, "Game Theory Based Trust Model for Cloud Environment", 2015, 10 pages, The Scientific World Journal, vol. 2015, Article ID 709827.

Open Mobile Alliance, "Dictionary for OMA Specifications", Jun. 26, 2012, 46 pages, version 2.9.

Openfog Consortium, "Glossary of terms related to Fog Computing & Networking", 2017, 12 pages, https://www.openfogconsortium.org/wp-content/uploads/OpenFog-Consortium-glossary-of-terms-1.pdf.

Openfog Consortium, "The OpenFog Consortium Reference Architecture: Executive Summary", 2017, 10 pages, https://www.openfogconsortium.org/wp-content/uploads/OpenFog-Reference-Architecture-Executive-Summary.pdf.

* cited by examiner

TRUST MANAGEMENT MECHANISMS

FIELD

Embodiments discussed herein are related to computing, and in particular, to Fog and Edge computing networks having particular application to wireless communication technologies.

BACKGROUND

As IoT, Edge, and Fog systems evolve, resources and/or autonomic systems will need to interact with one another to provide services to end users. The interaction may require exchanging data and/or changing a state or mode of operation. In some cases, before an interaction may take place, a trust relationship may need to be established between two devices or a pre-existing trust relationship may need to be confirmed or validated. An example where trust relationships may need to be established/validated includes dynamic construction of clusters across a Fog/Edge network that employs relay Fog/Edge Nodes (FNs). In several instances, managing trust among FNs may not be guaranteed during service delivery as the service delivery route changes.

Many autonomic systems incorporate standard interfaces, connections, objects, metadata, and telemetry to establish/confirm trust relationships and communicate with one another. However, some devices may encounter other devices that do not incorporate the same mechanisms to establish/validate trust relationships, but a level of trust will still need to be established. A trust relationship may be established or validated by performing some sort of handshake procedure, key exchange procedure, or the like. However, establishing/validating a trust relationship using these procedures may be difficult in situations where the entire interaction needs to take place relatively quickly (e.g., within a few seconds), or where such procedures are otherwise not suitable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
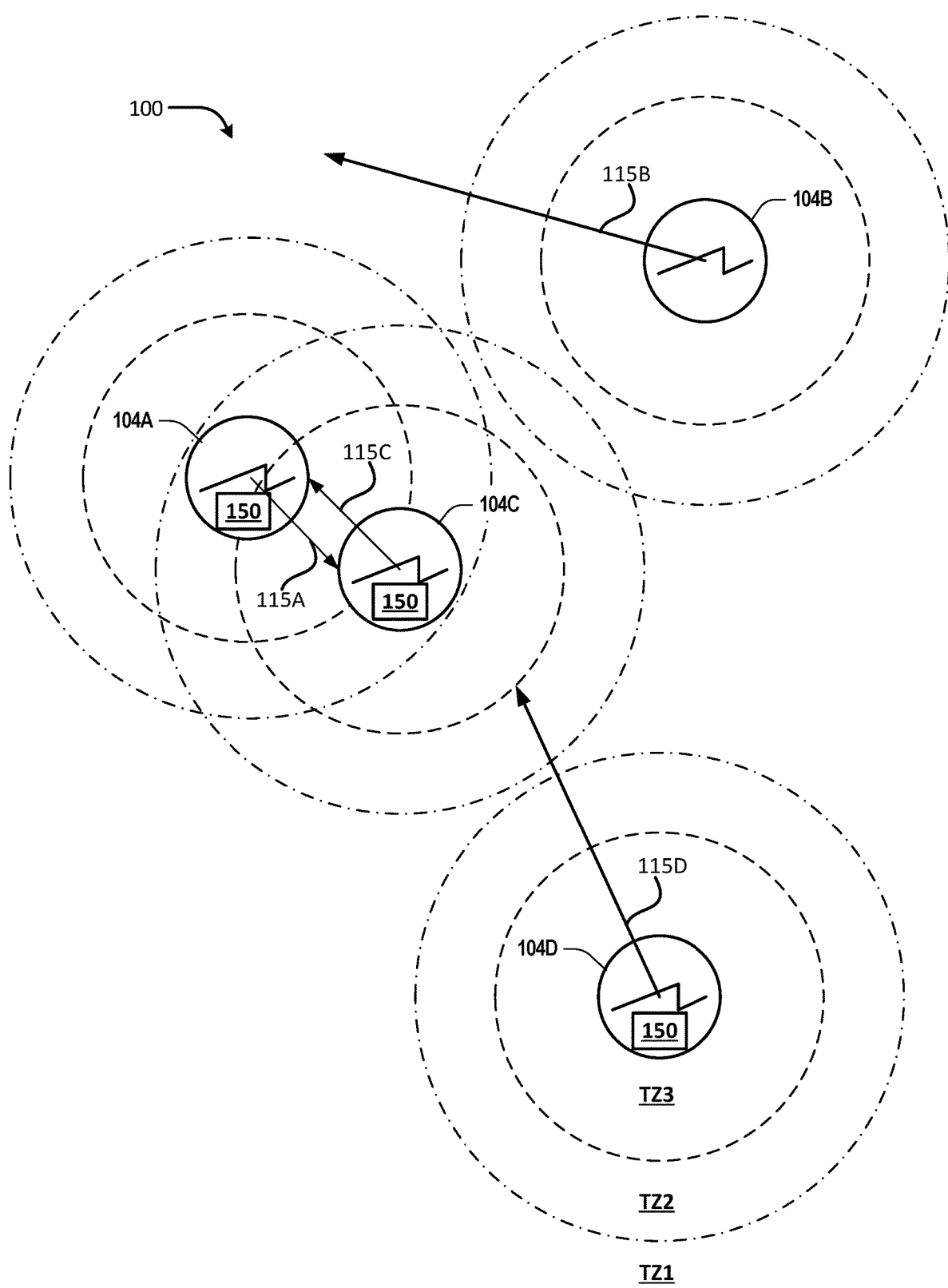
FIG. 1 illustrates an example environment in which aspects of the embodiments can be practiced.

Disclosed embodiments provide mechanisms for managing mutual and transitive trust relationships between FNs, autonomous devices, and/or analog/biological resources to provide collaborative, trusted communication over Fog/Edge networks for service delivery. According to various embodiments, a device establishes or validates a trust relationship by observing neighboring/proximate devices and determining trust level for those neighboring/proximate devices. The trust level may be based on predefined trust zones that define degrees of trust. In embodiments, the device observes neighboring/proximate devices, identifies the neighboring/proximate devices (including authentication of the neighboring/proximate devices, if possible), determines a potential interaction with one or more of the neighboring/proximate devices, and determines a trust level for the neighboring/proximate devices based on the potential interactions and identification (and/or authentication if possible). The device may also assign the neighboring/proximate devices to corresponding trust zones based on the potential interactions and identification (and/or authentication if possible). The trust level determination (or trust zone assignment) is based on the amount and type of information that the device can collect or observe prior to interacting with a neighboring/proximate device. For example, a neighboring/proximate device may be assigned to a least trusting (high risk) trust zone if the device is only able to observe the neighboring/proximate device's behavior (e.g., vector, position, velocity, acceleration, etc.), whereas the neighboring/proximate device may be assigned to a higher trusting (lower risk) trust zone if the neighboring/proximate device shares identification information and/or security credentials.

In embodiments, the device may operate in a Fog/Edge mode of operation (FMO) or an analog mode of operation (AMO), and the trust level (or trust zone) determination may be based on a mode of operation. The FMO is applicable to interactions between two or more autonomous systems where data, objects, metadata, etc. are exchanged in order to ensure secure engagement. When operating in FMO, the device may assign other devices to trust zones as described previously. The AMO is applicable to interactions between two or more devices where one or more of autonomous systems are not able or willing to exchange data. When operating in AMO, the device may assign other devices to trust zones based on observation data, and the device uses a more refined approach to determining the trust or risk levels of neighboring/proximate devices. Other embodiments are described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

I. Trust Establishment and Management Embodiments

Referring now to FIG. 1, wherein an overview of an environment 100 for incorporating and using the trust zone technology of the present disclosure in accordance with various embodiments, is illustrated. As shown, for the illustrated embodiments, example environment 100 includes a plurality of resources 104 (labeled 104A through 104D in FIG. 1). The resources 104 may be any type of system, device, or collection of capabilities provided by one or more systems or devices, including autonomic/autonomous devices, analog devices, legacy devices, or biological systems. For illustrative purposes, the resources 104 may be IoT devices, which operate with little to no human intervention, and the environment 100 may be (or may be within) an Edge network or Fog computing system. Where the resources 104 are within an Fog/Edge system/network, the resources 104 may be referred to as Fog/Edge Nodes (FNs) 104. The FNs 104 are physical and logical network elements that implement fog computing services, and may be considered analogous to a server in a cloud computing system.

IoT, fog systems, and edge computing is contributing to the evolution in connectivity/network technologies usage with diverse services having different requirements for Service Level Agreements (SLAs) based on application types and application requirements (e.g., real-time, non-real-time, entertainment, mission-critical, etc.). Typically, SLA-based conventions are limited to service delivery guarantee in a timely manner, which is at least implicitly conditioned by network bandwidth availability). The expansion of service fulfillment to the far edge of a network (e.g., closer to and including user/client devices, IoT devices, and the like) requires trust relationships to be established and maintained for the FNs 104 at least to prevent or reduce the likelihood of malicious attacks, such as malicious command and control (C&C) activities (e.g., bot herding), man-in-the-middle (MiM) attacks, and the like. The relationships between FNs 104 that are in proximity to each other and the emergence of the Fog/Edge clusters may require trust establishment and management to be part of the SLA since at least some of these resources 104 are in motion, have direction, rate of acceleration/deceleration and intermittent connectivity.

As IoT and Fog/Edge computing evolves, the resources 104 (including autonomic systems and analog/biologically controlled systems) within an edge network or fog system may need to interact with one another. The autonomic resources 104 may incorporate standard interfaces, connections, objects, metadata, and telemetry to communicate with one another, and potentially with other systems/devices. However, there may be instances when these interactions will not be needed or may be redundant, such as when a trust relationship between two resources 104 has already been established. Additionally, there may be some instances where an interaction may be brief (e.g., a few seconds), and a level of trust will need to be established without the exchange of credentials; with the anticipation of the potential for threat; with the knowledge of resource 104 vector information (e.g., movement direction, speed, position, orientation, acceleration, etc.); and/or with the understanding of the interfaces and data coming with or preceding an approaching entity. In addition, when autonomic resources 104 and analog/biologically controlled resources 104 interact with one another, they will need to establish a level of trust based on observed indicators instead of exchanging data. Another concern is with the dynamic construction of clusters across a Fog/Edge network and the reliance on relay FNs 104 because managing trust in these cases may not be guaranteed during service delivery as the service delivery route dynamically changes over time as FNs enter and leave the fog/edge network/system.

According to various embodiments, one or more of the resources 104 include trust management technology 150 of the present disclosure, which allows the resources 104 to establish and manage trust relationships with other resources 104, and to perform other threat/risk assessment functions. The trust management technology 150 manages mutual and transitive trust relationships between two or more autonomous resources 104, between autonomous resources 104 and analog/biological resources 104. The trust management technology 150 manages trust between FNs 104 and/or autonomous/self-aware systems 104 to guarantee SLAs, which includes ensuring that a service delivery route is through trusted nodes. The trust management technology 150 also allows the resources 104 to provide collaborative and trusted communication over a Fog/Edge network for service delivery. Various aspects of the trust management technology 150 will be further described infra.

According to various embodiments, the notion of trust is provided by trust levels. As used herein, the term "trust" may refer to a level of assurance that an object or resource 104 will behave satisfactorily. Trust is a particular level of subjective probability with which a resource 104 assesses that an object, another resource 104, group of resource 104, etc. will perform a particular action, both before a subject resource 104 can monitor such action and in a context in which it affects the subject resource's 104 own action(s). As used herein, the term "trust level" may refer to an amount of trust that a resource 104 assigns or grants to another resource 104, object, group of resources 104, etc. A trust level indicates a level of trustworthiness to a subject resource 104 or a system, and upon each action performed by one or more observed resources 104, is recalculated and modified accordingly based on the outcome of performance of the one or more actions. In various embodiments, the trust level is used to determine an amount of access to a resource 104 that the resource 104 provides to another resource 104, and/or determines an amount of services that one resource 104 provides to another resource 104. In some embodiments, the trust level is used as a basis for forming fog device clusters and/or for relaying network traffic. In some embodiments, an initial trust level is configured by an owner/operator of a particular resource 104, and each resource 104 evaluates trust levels to be assigned to other resources 104 based on observed behaviors and contextual information.

According to various embodiments, trust levels are assigned to corresponding Trust Zones (TZs). FIG. 1 shows an example implementation of TZs, where each of the resources 104 include a multiple trust zones illustrated by circles with dashed lines. In the example of FIG. 1, each of the resources 104 includes a first trust zone (TZ1) that is an outermost TZ, a second trust zone (TZ2) that is a middle TZ, and a third trust zone (TZ3) that is an innermost TZ (i.e., closest to the resource 104). In FIG. 1, not all of the trust zones are labeled for the sake of clarity. In embodiments, the TZs make use of existing hardware platform capabilities, wherein hardware root of trust can be used to initiate mutual trust between resources 104.

In embodiments, an individual resource 104 (referred to as a "subject resource" or "subject device") may observe neighboring/proximate resources (also referred to as an "observed resources" or "observed devices"), and assigns the observed resources 104 to respective TZs based on observed conditions and contextual information. A resource 104 may be considered "neighboring" or "proximate to" the subject resource 104 when the resource 104 travels to an area surrounding the subject resource 104, enters a specific area (e.g., a geofence), or comes within a certain distance from the subject resource 104. These areas or distances may be predefined or configured by a device manufacturer or a user of the subject resource 104. In some embodiments, these areas or distances may be based on the sensing/observation capabilities of the subject resource 104, for example, a transmit power or intended range of an optical, infrared, or RF-based proximity sensor implemented by the subject resource 104 or image recognition capabilities when the subject resource 104 uses image capture devices for observing neighboring resources 104. Furthermore, it should be noted that the subject resource 104 does not have to be actively communicating with the neighboring/proximate resource 105; rather, the subject resource 104 only has to be aware or otherwise detect the presence of the neighboring/proximate resource 105. In embodiments, the subject resource 104 determines a trust level of the observed resources 104 based on the determined TZs. In embodiments, each of the TZs may correspond to a trust level. In the example of FIG. 1, the outermost TZs are less restrictive than inner TZs. For example, TZ1 is less restrictive than TZ2, and TZ2 is less restrictive than TZ3. In some embodiments, an amount of threat (or risk level) may increase as an observed resource 104 becomes closer to a subject resource 104. Additionally, the subject resource 104 may determine and perform one or more actions based on the determined trust level of an observed resource 104, such as performing evasive maneuvers, issuing or triggering alarms, sending notifications to one or more other devices or systems, and/or the like.

In these embodiments, the trust management technology 150 is configured to determine a risk level and/or trust level (and assign an observed resource 104 to an appropriate TZ) based on an observed approach of the observed resource 104 and a current context of the subject resource 104. The term "approach" refers to how an observed resource 104 is to come near, or nearer to, the subject resource 104 in distance, change in position (in 3D space), speed, and time, or the term "approach" refers to how the subject resource 104 is to come near, or nearer to, the observed resource 104 in distance, angle, change in position (in 3D space), speed, and time. In embodiments, an observed approach may be classified into a particular approach category based on approach criteria (e.g., distance, angle, change in position (in 3D space), speed, and time).

As an example, the approach categories may include a direct approach, an indirect approach, or a glancing approach. The direct approach may be where an observed resource 104 (or subject resource 104) moves from a current position towards a position of the subject resource 104 (or observed resource 104) by a shortest path without changing direction. In other words, a direct approach may mean that one resource 104 is approaching a stationary resource 104, or that two resources 104 are approaching each other, head-on. With the direct approach, the likelihood of breaching all three trust zones is high and the rate (velocity or acceleration) of the approach may determine the timeliness of when a breach is likely to occur. In embodiments, the likely interaction based on a direct approach should be at or close to TZ3.

The indirect approach may be where an observed resource 104 (or subject resource 104) moves from a current position towards a position of the subject resource 104 (or observed resource 104) by a path that is not the shortest path. The not shortest path may be indicative of a vector 115 of an observed resource 104 (or subject resource 104) being at an acute angle with respect to the subject resource 104 (or observed resource 104). In other words, an indirect approach may mean that one resource 104 is approaching another resource 104, or that two resources 104 are approaching each other, at skewed vectors 115. With the indirect approach, the likelihood of breaching all three trust zones is less than the direct approach and greater than the glancing approach (i.e., a "medium" probability), and the rate (velocity or acceleration) of the approach may determine the timeliness of when the breach is likely to occur. With an indirect approach, the likely interaction should be at or close to TZ2.

The glancing approach may be where an observed resource 104 (or subject resource 104) moves from a current position towards a position of the subject resource 104 (or observed resource 104) at an angle rather than directly or an angle of an indirect approach. This angle may be an obtuse angle of a vector 115 of an observed resource 104 with respect to the subject resource 104 (or observed resource 104). In other words, a glancing approach may mean that a resource 104 is approaching a stationary resource 104, or that two resources 104 are approaching each other, at a vector that will result in little to no interaction between the resources 104. With the glancing approach, the likelihood of breaching all three trust zones is low, or very low, and the rate (velocity and/or acceleration) of the approach will determine the timeliness of when the breach is likely to take place. The likely interaction for a glancing approach should be at or close to TZ1.

In embodiments, the trust management technology 150 is configured to determine the approach of observed resources 104 based on vectors 115 associated with respective resources 104. The vectors 115 are representations of movements, each of which have a magnitude and direction, and are used to determine the position of a resource 104 in space relative to another resource 104. As shown by FIG. 1, each of the resources 104 includes a corresponding vector 115 (labeled 115A through 115D). The size or length of the vectors 115 corresponds to a travel velocity of the corresponding resource 104, and the direction to which the vectors 115 point correspond to a travel direction of the corresponding resource 104. For example, in FIG. 1 the vector 115C corresponding to resource 104C points towards resource 104A to indicate that the resource 104C is travelling toward the resource 104A, and the vector 115A corresponding to resource 104A points towards resource 104C to indicate that the resource 104A is travelling toward the resource 104C. In this example, the trust management technology 150 of resource 104C may determine that a direct approach of resource 105A is imminent, and may assign the resource 104A to TZ3 of the resource 104C. Similarly, the trust management technology 150 of resource 104A may determine that a direct approach of resource 105C is imminent, and may assign the resource 104C to TZ3 of the resource 104A.

In another example, FIG. 1 shows that the resource 104B is travelling in a glancing manner with respect to resources 104A and 104C based on the direction of the corresponding vector 115B. The example of FIG. 1 also shows that the resource 104B is traveling at a greater speed/velocity than the other resources 104 since the vector 115D has a greater size or length than the vectors 115A, 115C, and 115D. In this example, the trust management technology 150 of resource 104A may determine that resource 104B is approaching at a glancing approach and may assign the resource 104B to TZ1 of the resource 104A. In some cases, the trust management technology 150 of resource 104A may not assign the resource 104B to a trust zone if resource 104B is not predicted to interact with resource 104, where this determination may be based on the observed glancing approach. In another example, FIG. 1 shows that the resource 104D is indirectly approaching resource 104C based on the direction of the corresponding vector 115D. In this example, the trust management technology 150 of resource 104C may assign the resource 104D to TZ2 of the resource 104C based on the direction and magnitude (e.g., travel velocity) of vector 115D.

In general, the trust level determined for an observed resource 104 is based on an observed approach, including the travel direction and travel velocity, because the observed approach is indicative of the amount of time that the subject resource 104 may have to authenticate or verify the observed resource 104. The amount of time that the subject resource 104 may have to authenticate or verify an observed resource 104 may indicate the amount or type of data that the subject resource 104 may use to authenticate/verify the observed resource 104. In this way, the trust management technology 150 is able to evaluate, manage, and respond by performing an appropriate behavior by each participant of an engagement based on security level, trust level, and/or understanding of the risk. This enables a range of services from mission critical services to more complex services, such as two or more computer assisted or autonomic vehicles collaborating for platoon creation and maintenance for the purpose of sharing power, reduce wind resistance, etc. The services may include relatively simple relationships, such as computer assisted or autonomic vehicles, or mixed (autonomous and analog/biological) automobiles passing each other on the freeway. As an example, with reference to FIG. 1, the trust management technology 150 of resource 104A may assign resource 104C to TZ3 since the trust management technology 150 of resource 104A may not have enough time to authenticate resource 104C due to the imminent and direct approach of resource 104C. In another example, with reference to FIG. 1, the trust management technology 150 of resource 104C may assign resource 104D to TZ2 or TZ1 since the trust management technology 150 of resource 104C may have some time to authenticate resource 104D based on the approach of resource 104D with respect to resource 104C.

According to various embodiments, the risk level or trust level may be based on contextual information and/or situation information. The situation information may include vector data, such as proximity, approach, departure, altitude, and/or vector information. The vector information may include travel direction, travel speed (velocity), and/or travel acceleration.

The contextual information (also referred to as "context information" or the like) may include any type of information about a current state of the subject resource 104, including information about events leading up to the current state. These events may include interactions with other resources 104 including information about preexisting relationships with the other resources 104. The context information may include a system context, which refers to information about a state of the resource 104 itself or individual components of the resource 104 (e.g., transmission/reception power, processor utilization, processor load, memory and/or storage utilization, battery state (e.g., current charge, etc.), thermal data, etc.), logical environment (e.g., network connectivity, data received over a network, etc.), and/or physical location of the resource 104 (e.g., being in a home network, a visiting network, geolocation, geopolitical location (nation, state/province, county, municipality, etc.), and/or the like). In various embodiments, the context information may include other information, both outside and inside the resource 104, data, and/or conclusions that may be drawn from that information and data.

According to various embodiments, determinism between the resources 104 is defined based on a trust to risk ratio (Trust:Risk), where the risk level increases as a trust level decreases, and vice versa. In other words, for the Trust:Risk, the risk level increases as an observed resource 104 approaches TZ1 and passes through TZ2 and TZ3, and the risk level decreases as the observed resource 104 moves outward from TZ3 towards TZ1. In embodiments, the Trust:Risk ratio is based on a ratio of empirical data to observation data (or situation information). In other words, the ratio Trust:Risk is the {(empirical:observed ratio) of the (Trust: Risk) ratio}. The empirical calculation used to determine the trust zones is explained infra with regard to FIG. 2.

According to various embodiments, the trust management technology 150 is configured to determine and manage a trust model to be used for an individual interaction, and to ascertain risk for the purpose of the interaction and relationship between an autonomous resources 104 and analog/biologically controlled resources 104, or between two autonomous resources 104 when a discrete level of security is not needed. In some embodiments, the trust management technology 150 may operate in one of two modes of operation, including a Fog/Edge Mode of Operation (FMO) and an Analog Mode of Operation (AMO).

The FMO is applicable to interactions between two or more autonomous resources 104 where data, objects, and metadata are exchanged in order to ensure secure engagement, or where one or more of the autonomous systems are not able or willing to provide such data. In the FMO, the trust management technology 150 may utilize various types of information, in addition to situation information, to authenticate an observed resource 104. Examples of such information may include identification information (e.g., device identifier (ID), service provider ID, user ID, device serial number, etc.) and security information (e.g., digital certificates, etc.).

The AMO is applicable to interactions between an autonomous resource 104 and an analog/biological resource 104 where data, objects, and metadata cannot be exchanged due to the capabilities of the analog/biological resource 104. The analog devices may include devices/systems that do not include computing functionality, and legacy devices that have computing functionality but are otherwise incapable of implementing the trust management technology 150. Biological resources 104 may include entities that are no mechanical in nature, such as humans and non-human animals. In the example of FIG. 1, resource 104B may be an analog or biological resource that does not include the trust management technology 150, and therefore, resource 104B does not have a trust zone and cannot provide any metadata, telemetry or other details about itself to the other resources 104.

In the AMO, the use of observation information (or situation information) versus empirical data. In some embodiments, when in the AMO, the trust management technology 150 is configured to determine or classify the approach of an observed resource 104 based on the approach classifications discussed previously (e.g., direct, indirect, or glancing). In embodiments, the trust management technology 150 operating in AMO is configured to rapidly calculate the risk and threat levels based on errant behavior, the significant deviation from previously observed behavior, and/or the deviation from expected behavior based on rules and policies which govern a particular situation or context. For example, a computer assisted or autonomous vehicle may observe an "analog vehicle" drifting outside of a highway lane, which is a deviation from typical driving rules and regulations, and the computer assisted or autonomous vehicle may take different evasive actions based on this observation and based on an approach of the analog vehicle (or the computer assisted or autonomous vehicle) with respect to the computer assisted or autonomous vehicle (or the analog vehicle).

Table 1 describes various permutations of possible behaviors and estimated levels of trust, risk, and the associated determinism and probability based on the resources 104 depicted by FIG. 1. For the purposes of table 1, the resources 104A, 104C, and 104D are autonomic resources, and resource 104B is an analog/biological resource.

TABLE 1

| Subject Resource | Observed Resource | Approach Type | Approach Rate | Interaction Type | Trust Level | Risk Level |
|---|---|---|---|---|---|---|
| Autonomic | Autonomic | Direct | High | Deterministic | High | Medium |
| Autonomic | Autonomic | Indirect | High | Deterministic | High | Medium |
| Autonomic | Autonomic | Glancing | High | Deterministic | High | Low |
| Autonomic | Autonomic | Direct | Medium | Deterministic | High | Medium |
| Autonomic | Autonomic | Indirect | Medium | Deterministic | High | Medium |
| Autonomic | Autonomic | Glancing | Medium | Deterministic | High | Low |
| Autonomic | Autonomic | Direct | Low | Deterministic | High | Low |
| Autonomic | Autonomic | Indirect | Low | Deterministic | High | Low |
| Autonomic | Autonomic | Glancing | Low | Deterministic | High | Low |
| Autonomic | Analog/Bio | Direct | High | Probabilistic | Low | High |
| Autonomic | Analog/Bio | Indirect | High | Probabilistic | Low | High |
| Autonomic | Analog/Bio | Glancing | High | Probabilistic | Medium | Medium |
| Autonomic | Analog/Bio | Direct | Medium | Probabilistic | Low | High |
| Autonomic | Analog/Bio | Indirect | Medium | Probabilistic | Medium | Medium |
| Autonomic | Analog/Bio | Glancing | Medium | Probabilistic | Medium | Medium |
| Autonomic | Analog/Bio | Direct | Low | Probabilistic | Medium | Medium |
| Autonomic | Analog/Bio | Indirect | Low | Probabilistic | Medium | Medium |
| Autonomic | Analog/Bio | Glancing | Low | Probabilistic | High | Low |

In table 1, the subject resource column indicates a type of resource 104 that is observing other resources 104; the observed resource column indicates a type of resource 104 that is being observed by the subject resource 104; the approach type column indicates an approach of the observed resource 104 with respect to the subject resource 104, or vice versa; the approach rate column indicates the speed (velocity) and/or an acceleration of the approach in the approach type column; the interaction type indicates whether the interaction between the subject resource 104 and the observed resource 104 is predicted to be a deterministic interaction or a probabilistic interaction; the trust level column indicates a calculated trust level based on the previously described columns; and the risk level column indicates a calculated risk level based on the previously described columns (which may or may not include the trust level column). Additionally, the values in the approach rate column may be based on different speed (velocity) thresholds. Similarly, the values in the risk level and trust level columns may be based on different risk level thresholds and trust level thresholds, respectively. These thresholds may be preconfigured or adapted based on empirical data collected by the trust management technology 150.

With respect to the interaction type column, the a deterministic interaction is an interaction in which, given particular situation information and/or context information input, is likely to produce the same outcome, with the subject resource 104 and/or the observed resource 104 passing through the same sequence of states or performing the same sequence of operations. By contrast, the probabilistic interaction is an interaction in which a result or outcome of the interaction is dependent on chance or probability. In various embodiments, because the outcome of probabilistic interactions are less certain than deterministic interactions, the trust management technology 150 may be configured to consider probabilistic interactions as more risky or less trustworthy. In other words, the trust management technology 150 may be configured to assign probabilistic interactions to a higher risk level or lower trust level than deterministic interactions given the same set of situation and/or context information.

Example use cases for the embodiments of the present disclosure are as follows: In these examples, the subject resource 104 is a home automation system (also referred to as a "smart home") including a plurality of IoT devices, and the observed resource 104 is a delivery truck that is or is not an autonomic resource 104. In a first example use case, the smart home detects the delivery truck travelling past the house to which it is attached. In this example, the smart home determines that no orders have been made, and therefore, determines that there is probably no delivery to the house. The smart home recognizes (e.g., observes and authenticates) the delivery truck since the delivery truck crossed through TZ1 of the smart home. The smart home may identify and/or authenticate the delivery truck using identification information and/or security information when operating in the FMO. When operating in AMO, the smart home may identify the delivery truck using for example, image recognition techniques on the truck itself and/or logos painted on the truck. In this example, the smart home determines that there is a loose relationship between the smart home and the delivery truck, and determines that the delivery truck is not a threat based on observed situation information (e.g., vector, acceleration, speed and data associated with the delivery truck). In this example, the smart home does not issue or trigger an alarm because of the determined risk level.

A second example use case continues with the first example use case where the delivery truck stops in front of the house to which the smart home is attached. In the second example use case, the behavior of the delivery truck does not map with the expectations determined by the smart home in the first example use case. In particular, delivery truck is now approaching TZ2 of the smart home. Furthermore, TZ1 and TZ2 of delivery truck are also overlapping TZ1 and TZ2 of the smart home. In the second example use case, the smart home increases the threat (risk level) assigned to the delivery truck. Based on the heightened threat, the smart home may continue to observe the situation, or may issue a notification or trigger an alarm based on a service provider configuration or the like.

A third example use case continues with the second example use case where a delivery person exits the delivery truck, walks up to the house, and knocks on the door of the house. In this example use case, the smart home may raise the risk level (or perceived threat) to a highest risk level because the TZ3 for both resources 104 are partially or completely overlapped. Based on the heightened risk level, the smart home may issue a notification or trigger an alarm to indicate the presence of the delivery person. In some embodiments, the smart home may control various electro-mechanical devices to lock-down the house (e.g., lock doors, close and/or lock windows, etc.).

Figure 2:
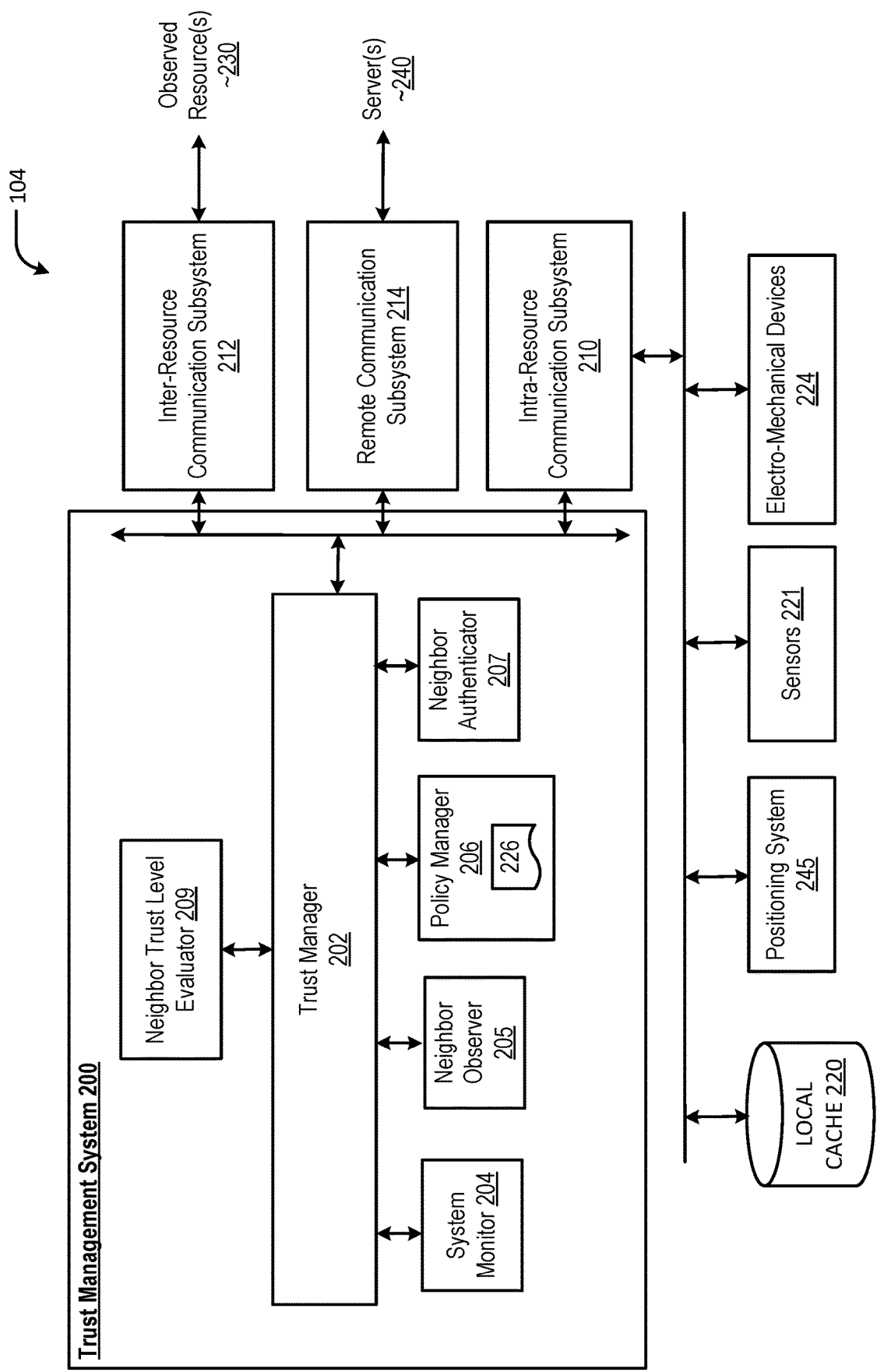
FIG. 2 illustrates a component view of an example trust management system, according to various embodiments.

Referring now to FIG. 2, wherein a component view of an example trust management system 200, according to various embodiments, is illustrated. In embodiments, the trust management system 200 may be trust management technology 150 implemented in a resource 104 as discussed with regard to FIG. 1. As shown, the trust management system 200 includes trust manager 202, system monitor 204, neighbor observer 205, policy manager 206, neighbor authenticator 207, and neighbor trust level evaluator 209. Additionally, the resource 104 may include an intra-resource communication subsystem 210, inter-resource communication subsystem 212, remote communication subsystem 214, sensors 221, and electro-mechanical devices 224. In other embodiments, trust management system 200 may include more or less subsystems than are shown by FIG. 2.

In various embodiments, the particular entities of the trust management system 200 that are used for trust level evaluation may depend on the mode of operation of the trust management system 200. In such embodiments, when the trust management system 200 is operating in FMO, the following entities are enabled: trust manager 202, system monitor 204, neighbor observer 205, neighbor authenticator 207, and neighbor trust level evaluator 209. In addition, when the trust management system 200 is operating in AMO, all of the entities of the trust management system 200 are enabled.

Continuing with the example of FIG. 2, the neighbor observer 205 is configured to assess conditions of an area immediate surrounding the resource 104, which may be based on received sensor data. The neighbor observer 205 is configured to receive sensor data from sensors 221 of the resource 104 with the assistance of intra-resource communication subsystem 210, and in some embodiments, may receive sensor data held by one or more remote servers 240 with the assistance of remote communication subsystem 214. The neighbor observer 205 is also configured to receive sensor data held by other observed resource(s) 230 with the assistance of inter-resource communication subsystem 212, and could also receive sensor data held by surrounding infrastructure (e.g., routers, base stations, etc.) with the assistance of inter-resource communication subsystem 212 or remote communication subsystem 214. What constitutes the immediate surrounding area may be application dependent, and varies from embodiment to embodiment. In some embodiments, the size of the immediate surrounding area assessed may be configurable by a user, the manufacturer of the resource 104, or a developer of the trust management system 200. According to various embodiments, in FMO and AMO, the neighbor observer 205 continuously tracks the observed resource(s) 230 and identifies whether the observed resource(s) 230 are fixed/stationary or mobile. In some embodiments, the neighbor observer 205 may only observe the resources 104 that are one hop from the subject resource 104. The neighbor observer 205 is also configured to determine vector 115 information (e.g., travel direction, travel velocity, travel acceleration, etc.) about the observed resource(s) 230, and compares these observed metrics with the vector information of the subject resource 104. In other embodiments, this comparison may be done by the trust manager 202 or the neighbor trust level evaluator 209.

In some implementations, the resource 104 may be equipped with a positioning system 245 (or alternatively "geolocation circuitry/system," "navigation circuitry/system," or the like) configured to receive signaling and convert the signaling (or information encoded therein) into a location and/or position (within some margin of error). In some implementations, the positioning system 245 may be a GNSS receiving that converts GNSS signals received from satellite constellation node or terrestrial stations and uses the information in the GNSS signals to determine geolocation coordinates of the resource 104 (see e.g., discussion of positioning circuitry 645 of FIG. 6). Additionally or alternatively, positioning system 245 may be an indoor positioning system (IPS) based on signal strength indicators or the like, a hybrid system combining GNSS and local positioning systems, and/or other like positioning and/or location detection systems. However, some implementations, geolocation and/or positioning information may come from other sources including an IP address, WiFi MAC address, Bluetooth or BLE MAC address, radio-frequency identification (RFID), WiFi connection location, cellular network cell IDs, cellular network location services, and/or the like. According to various embodiments, the neighbor observer 205 is configured to use the positioning (or geolocation) information to determine a relative position of the subject resource 104 with respect to the observed resource(s) 230.

According to various embodiments, the neighbor observer 205 is configured to determine the position of the subject resource 104 relative to the observed resource(s) 230 by way of triangulation. In these embodiments, an exact or estimated geolocation or position may not be necessary for the relative position determination and the neighbor observer 205. One embodiment of triangulation may include the neighbor observer 205 performing a received signal strength indication (RSSI) calculation of one or more signals generated by the observed resource(s) 230 and an RSSI calculation of one or more signals generated by one or more other resources (e.g., a network element or some other non-observed resource 104). Another embodiment of triangulation may include the neighbor observer 205 obtaining an RSSI calculation of one or more signals generated by the other resource 104 performed by one or more other resource 104 and/or an RSSI calculation of one or more signals generated by a network element, which are then shared with the neighbor observer 205. Another embodiment of triangulation may include the other resource(s) 104, network element, or server(s) 240 performing an RSSI calculation of one or more signals generated by multiple resources 104 in an environment (e.g., environment 100 of FIG. 1), which is then shared with the neighbor observer 205. In either of the aforementioned embodiments, the RSSIs or RSSI calculations may be provided to the neighbor observer 205 by the inter-resource communication subsystem 212 or the remote communication subsystem 214 via the intra-resource communication subsystem 210. Additionally, the aforementioned RSSI calculations may be performed by the neighbor observer 205, the other resource(s) 104, the network elements, and/or the remote server(s) 240 according to know methods.

In addition or alternative to using the RSSI of the signals generated by the various resource(s) 104 and/or network elements in an environment (e.g., environment 100 of FIG. 1), the neighbor observer 205 may also utilize other information associated with the one or more signals, such as path loss measurements, packet delay time, signal to noise ratio, signal to noise plus interference ratio, throughput measurements, jitter, latency, round trip time (RTT), number of interrupts, out-of-order delivery of data packets, and/or other like parameters. Furthermore, any of the aforementioned triangulation embodiments may be combined to determine the position of the subject resource 104 relative to observed resource(s) 230. As such, in various embodiments, more position and/or orientation information may become available as a number of resources 104 in an environment increases. In some embodiments, only the RSSI of the observed resource(s) 230 is/are used instead of one or more of the aforementioned triangulation embodiments, such as by defining that a signal strength of the observed resource(s) 230 must be greater than a threshold to indicate that the observed resource(s) 230 is within some desired distance from the subject resource 104.

In some embodiments, the neighbor observer 205 is configured to use directional signal reception and/or transmissions by one or more directional antennas to determine orientation of the various resource 104 in an environment. Directional antennas (or beam antennas) are antennas that radiate or receive signaling at greater strength (or power) in a specific direction. As discussed previously, the approach of observed resource(s) 230 may be used for threat assessment, and in such embodiments, an orientation of the subject resource 104 may be designed to facilitate the approach calculation, such as when the subject resource 104 is travelling toward the observed resource(s) 230 or when the observed resource(s) 230 and the subject resource 104 are traveling towards each other. In these embodiments, a directional antenna of the observed resource(s) 230 and/or a directional antenna of the subject resource 104 may be used by the neighbor observer 205 to estimate an approximate orientation of the subject resource 104 relative to the observed resource(s) 230.

In some embodiments, the subject resource 104 includes one or more sensors 221, such as an accelerometer, gyroscope, gravimeter, magnetometer, and/or another like devices that are configured to measure and/or detect a motion, an acceleration, and/or an orientation of the subject resource 104. In such embodiments, the neighbor observer 205 is configured to obtain sensor data from these sensors 221, determines a magnitude and direction of an acceleration and/or motion of the subject resource 104, and converts the acceleration and/or motion of the subject resource 104 into a position and/or orientation of the subject resource 104. The positions and/or orientations (or changes in the positions and/or orientations) are then provided to the trust manager 202 as situation information, which is used by the neighbor trust level evaluator 209 to determine a trust zone and/or trust level according to the various example embodiments described herein.

Figure 6:
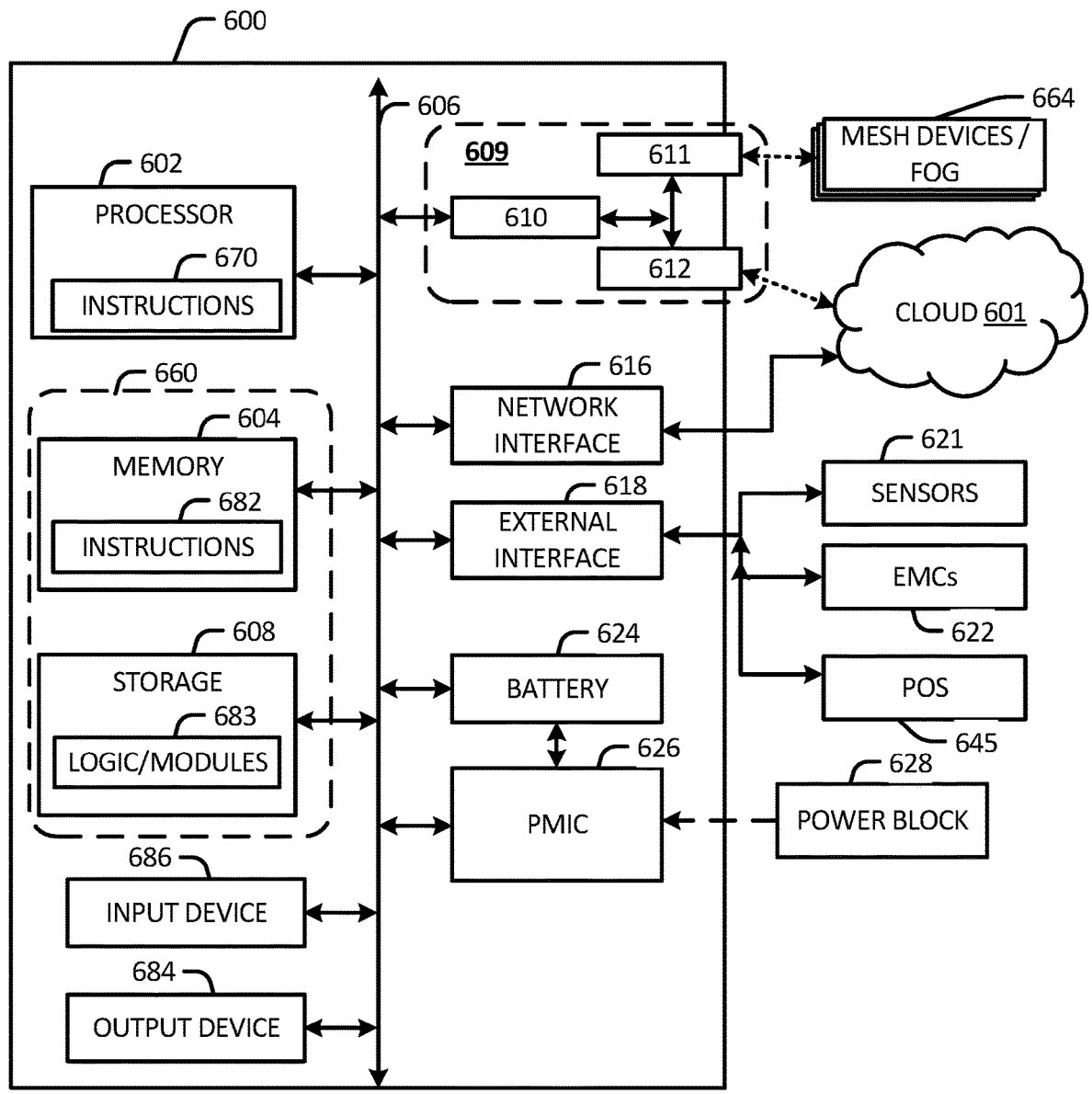
FIG. 6 illustrates an example implementation of a computing architecture, in accordance with various embodiments.

Sensor data from sensors 221 of the resource 104 (and sensor data held by observed resource(s) 230) may also include temperature readings collected by temperature sensor(s) of the subject resource 104, humidity readings collected by humidity sensor(s) of the subject resource 104, lighting measurements collected by light sensor(s) of the subject resource 104, images collected by image capture devices (e.g., cameras) of the subject resource 104, communication channel conditions measured communication circuitry of the subject resource 104, and other like data of other sensors 221, such as those discussed herein (see e.g., discussion of FIG. 6 infra). This sensor data may also include sensor data from various control systems of the subject resource 104, such as those discussed herein (see e.g., discussion of FIG. 6 infra). Sensor data held by remote servers 240 (and sensor data held by surrounding infrastructure) may include sensor data of the surrounding area, and may also include other types of sensor data of sensors 221 not included in/on the subject resource 104. The neighbor observer 205 is also configured to process the sensor data to determine the amounts, types, and changes in, for example, proximity to observed resource(s) 230 including Fog/Edge nodes and/or analog or biological objects. According to various embodiments, some sensor data is used as situation information (e.g., accelerometer measurements, gyroscope measurements, gravimeter measurements, image data, etc.) and some information is used as context information (e.g., temperature measurements, humidity measurements, light measurements, etc.).

Continuing with the example of FIG. 2, the neighbor authenticator 207 is configured to authenticate observed resources 104. Authentication is the process of verifying an identity of an observed resource 104, and may involve using one or more means of proof of identification (also known as "factors"). In embodiments, authentication of an observed resources 104 may be based on a determination as to whether a preexisting relationship exists between the subject resource 1094 and the observed resource 104. For example, in some embodiments, the authentication may be based on identification information, such as a device identifier (ID), service provider ID, a shared ID, an observed device type, or other like identification information, such as those discussed herein. In some embodiments, the authentication information may include peer based reputation scoring and/or previous engagement based familiarity information, such as empirical data recorded based on previous interactions with a particular resource 230/104. In these embodiments, the existence of authentication information (either stored locally, provided by the observed resource 104, or the like) may be indicative of a preexisting relationship directly between the observed resource 104 and the subject resource 104 or indirectly between the observed resource 104 and the subject resource 104 (e.g., where the observed resource 104 has a preexisting relationship with another resource 104, and the subject resource 104 also has a preexisting relationship with the other resource 104). It should be noted that authentication does not ensure trust, and as discussed in more detail infra, the trust level evaluator 209 is configured to use the authentication to evaluate trust.

In embodiments, the neighbor authenticator 207 is configured to authenticate observed resources 104 using security information, such as digital certificates or the like. These certificates include identifying information of the resource 104 (or owner/operator of the resource 104, as well as a public key of the resource 104 (or owner/operator of the resource 104), which is then encrypted using a private key of a certificate authority. These certificates may include one or more of the following pieces of information: a subject of the certificate (the party to which the certificate is issued and the owner of a public key); an issuer ID (identifies the certificate authority that has signed and issued the certificate); a validity period (a time limit for the validity of the message); subject public key information (the public key owned by a subject of the certificate and the algorithm with which the key is used); a usage identifier (indicates the intended use or purpose of the certificate); a certificate authority signature; a public key owned by the certificate authority; a random value or nonce; and/or other like information. The digital certificates discussed herein may be in the X.509 format, and may be signed using an Elliptic Curve cryptography Digital Signature Algorithm (ECDSA) or some other suitable algorithm, and the various key pairs discussed herein may be generated using an Elliptic Curve cryptography Key Agreement algorithm (ECKA) or some other suitable key generation algorithm. The certificates may include various certificates issued by the a certificate authority as delineated by the relevant Certificate Authority Security Council (CASC) standards, Common Computing Security Standards Forum (CCSF) standards, CA/Browser Forum standards, GSMA standards, ETSI standards, Global-Platform standards, or some other suitable standard.

When operating in FMO, the identification information and/or security information may be pre-shared between resources 104, such as when the resources 104 join a computing cluster or the resources 104 are Fog/Edge Nodes that join a cluster or region in a Fog/Edge network. In such embodiments, the neighbor authenticator 207 is configured to share the identification information and/or security information when the subject resource 104 joins a new cluster or region, and is configured to obtain new identification information and/or security information as other resources 104 (observed resource(s) 230) leave or join the cluster/region to which the subject resource 104 is a member. In these embodiments, the inter-resource communication subsystem 212 and/or the remote communication subsystem 210 are used to assist the neighbor authenticator 207 in obtaining the identification information and/or security information from other resources 104 (and/or observed resource(s) 230).

When operating in AMO, the identification information and/or security information may not be available due to the analog/biological nature of such resources 104. In such embodiments, the neighbor authenticator 207 is configured to authenticate observed resources 104 using other available information, such as sensor data from the sensors 221 or the like.

As alluded to earlier, inter-resource communication subsystem 212 is configured to facilitate communication with other resource(s) 104/230, which may include resources 104 discussed previously, including Fog/Edge Nodes, nearby infrastructure, or various computing devices (e.g., smartphones, tablets, wearables, laptops, desktop computers, etc.). In some embodiments, inter-resource communication subsystem 212 is configured to support inter-resource communication in accordance with one or more industry standards, such as cellular specifications provided by the Third Generation Partnership Project (3GPP) New Radio (NR) and/or Long Term Evolution (LTE) standards (including cellular vehicle-to-vehicle (V2V) or vehicle-to-everything (V2X) standards), a Local Area Network standard such as WiFi specified by a suitable IEEE 802.11 standard or Ethernet specified by a suitable IEEE 802.3 standard, Direct Short Range Communications (DSRC) and/or Wireless Access in Vehicular Environments (WAVE) specified by IEEE 802.11p and IEEE 1609.4, respectively, or some other suitable standard or combination(s) thereof. For these embodiments, the neighbor observer 205 is further configured, with the assistance of inter-resource communication subsystem 212, to scan and discover whether the other resource(s) 104/230 support a particular inter-resource communication industry standard. For WiFi/DSRC/WAVE implementations, the scan could include, for example, performing energy detection (ED) during a listen-before-talk (LBT) operation to detect an unoccupied channel. For LTE/NR implementations, the scan could include, for example, receiving a Radio Resource Control (RRC) configuration message indicating whether network resource allocation or autonomous resource selection is to be used, identifying resources for communicating sidelink control information (SCI) when network resource allocation is configured, performing an ED-based sensing operation to reserve resources for communicating SCI when autonomous resource selection is configured, and transmit or receive SCI over the identified/reserved resources. Further, trust manager 202 may be configured, with the assistance of inter-resource communication subsystem 212, to authenticate the other observed resource(s) 230, confirming that some or all of the observed resource(s) 230 include the trust management technology 150 or suitable communications and autonomic capabilities. Upon authentication of the other observed resource(s) 230, the neighbor authenticator 207 may control the inter-resource communication subsystem 212 to exchange authentication information, including identification and/or security information. In some embodiments, this information may be exchanged in a secure manner, in accordance with a security protocol specified by the mutually supported communication standard. For example, the authentication information may be encrypted prior to transmission to the other resource 104 or the like.

Continuing with the example of FIG. 2, the trust manager 202 is configured to (continuously or periodically) poll the neighbor observer 205 and the neighbor authenticator 207, and consult the neighbor trust level evaluator 209 to calculate a trust level for an one or more of the observed resources 230. In embodiments, the observed resource(s) 230 may correspond to any of the resources 104 in FIG. 1. The trust manager 202 is configured to send any necessary information needed on the subject resource 104, such as situation information and/or context information. This information may be based on sensor data obtained from one or more sensors 221 (e.g., direction & velocity and rate of approach or departure), EMC data obtained from one or more EMCs 224, and/or context information obtained from the system monitor 204. The trust manager 202 is configured to obtain the calculated trust level of the observed resource(s) 230 from the neighbor trust level evaluator, and control storage of the calculated trust level in association with an identifier or attribute of the observed resource(s) 230 in the local cache 220. The trust level and identifier/attribute may be stored in the local cache 220 using any suitable data structure, such as an attribute-value pair, key-value pair, or some other suitable database object. Furthermore, the trust manager 202 is configured to control the subject resource 104 to perform one or more actions based on the determined trust level. In some embodiments, controlling the subject resource 104 to perform one or more actions may involve generating and sending instructions to one or more sensors 221 or EMCs 224 to change a position/orientation of the subject resource 104. In some embodiments, controlling the subject resource 104 to perform one or more actions may involve generating one or more messages, and instructing/controlling the inter-resource communication subsystem 212 to send such messages to the observed resources 230, or instructing/controlling the remote communication subsystem 210 to send such messages to the servers 240 or some other remote device/system (e.g., client devices or the like).

Continuing with the example of FIG. 2, the neighbor trust level evaluator 209 is configured to calculate trust levels for observed resource(s) 230, and provide the trust levels to the trust manager 202. The trust level evaluator 209 is configured to empirically determine the type of information that needs to be known to determine the trust level for observed resource(s) 209. The trust levels can be calculated using empirical data or a combination of empirical and observed data including the adherence or deviation from common rules and policies. The neighbor trust level evaluator 209 is configured to take into account the situation itself, and determines trust zones which gives an idea of how much trust to give to observed resource(s) 230 (trust level). In these embodiments, the neighbor trust level evaluator 209 performs an empirical analysis using metrics and results of observations rather than using mathematically describable relationships. In these embodiments, the neighbor trust level evaluator 209 is configured to use the observations and context information of previous interactions and identify patterns and behavior based on those past interactions.

According to various embodiments, the neighbor trust level evaluator 209 is configured to assign the observed resource(s) 230 to respective trust zones as discussed previously, and calculates the trust level based on the assigned trust zones. As discussed previously, an observed resource 104 may be assigned to one of three trust zones. In such embodiments, the neighbor trust level evaluator 209 may determine a trust zone for the observed resource(s) 230 as follows.

TZ1 is the basic trust level, and in both FMO and AMO the TZ1 determination involves checking and evaluating the change (or delta "$\Delta$") between the subject resource 104 (or evaluator node (EVR) in a Fog/Edge network) and the observed resource(s) 230 (or evaluated nodes (EVDs) in the Fog/Edge network) in terms of a vector comprising {velocity, direction}. If the change is less than a trust threshold ($\Delta$<Trust Threshold), then the observed resource 230 is assigned to TZ1 of the subject resource 104.

TZ2 is a higher trust level than TZ1. In FMO, the TZ2 determination includes the criteria considered for TZ1 plus additional authentication information, such as the authentication information discussed previously. If the criteria of TZ1 is satisfied and the observed resource 230 is authenticated by neighbor authenticator 207 (i.e., {(TZ1=TRUE) && (observed resource 230=AUTHENTICATED)}), then the observed resource 230 is assigned to TZ2 of the subject resource 104. This TZ2 determination is applicable to FMO.

In this embodiment, TZ3 is the highest trust level, wherein resources 230 in TZ3 are considered to be a perceived threat, and therefore, an observed resource 230 must be able to achieve a proper level of trust in order to enter and stay within TZ3 for operation. In FMO, the TZ3 determination includes the criteria of TZ2 and some more stringent authentication similar to a traditional shared ID plus certificate. The more stringent authentication may involve verifying certificates of the observed resource(s) 230. In these embodiments, if the criteria of TZ2 is satisfied and the observed resource 230 is highly authenticated by neighbor authenticator 207 (i.e., {(TZ2=TRUE) && (observed resource 230=AUTHENTICATED+)}, then the observed resource 230 is assigned to TZ3 of the subject resource 104.

In AMO, since authentication information is likely not available, the trust zone determination includes consideration of the predicted approach type, approach rate, and predicted interaction type with the observed resource 230. For example, in AMO, the observed resource 230 may be assigned to TZ1 when the approach type is a direct approach, or when the interaction type is a deterministic interaction regardless of the determined approach type or the determined approach rate.

In another example, in AMO, the observed resource 230 may be assigned to TZ2 when one of the following conditions is met: (1) the observed approach rate is above a first threshold approach rate and the determined approach is a glancing approach; (2) the observed approach rate is below the first threshold approach rate, the observed approach rate is above a second threshold approach rate and the determined approach is an indirect approach or a glancing approach; and (3) the observed approach rate is below the second threshold approach rate and the determined approach is either an indirect approach or a glancing approach.

In another example, in AMO, the observed resource 230 may be assigned to TZ3 when the interaction type is a probabilistic interaction, the observed approach rate is above the first threshold approach rate, and the determined approach is a direct approach or an indirect approach.

As alluded to earlier, the neighbor trust level evaluator 209 utilizes context information for determining trust and/or risk levels. This context information may be obtained from the system monitor 204. The system monitor 204 is configured to monitor system resources and performance of the trust management system 200, and to identify detailed information about the hardware and software subsystems implemented by the subject resource 104 (on which the trust management system 200 is disposed). This information is or is part of the context information discussed previously. The system monitor 204 is configured to monitor and compile information about installed hardware devices (e.g., individual sensors 221 and individual EMCs 224 embedded or attached to the subject resource 104), drivers, applications, system settings, system software programs, AI agents, kernel extensions/modules, etc. implemented by the subject resource 104. The compiled information indicates current state information, such as current processor usage, current processor frequency, current processor temperature, currently running processes or tasks, current memory utilization and/or available memory space, memory Self-Monitoring Analysis and Reporting Technology (SMART) indicators, system uptime, current network addresses (e.g., IP addresses or the like), current network connections, battery charge, fuel levels, system name or identifier(s), user identifier(s), the date and time, geolocation coordinates, etc. The system monitor 204 is also configured to compile the system information into a suitable format (e.g., plain text, rich text format (RTF), WL, JSON, etc.), and to export the compiled information to the neighbor trust level evaluator 209 with the assistance of intra-resource communication subsystem 210 and/or trust manager 202. The system monitor 204 is also configured to receive requests from individual subsystems (e.g., the trust manager 202, neighbor trust level evaluator 209, one or more EMCs 224, etc.) and provide the compiled system information to the individual subsystems in response to those requests.

As discussed previously, the neighbor trust level evaluator 209 is configured to determine the trustworthiness of the observed resource(s) 230 for the subject resource 104. In some embodiments, the neighbor trust level evaluator 209 is configured to determine the trustworthiness of the observed resource(s) 230 for less sophisticated resources, such as an analog resource. In other words, in these embodiments, the neighbor trust level evaluator 209 is configured to between two or more observed resource(s) 230. Such embodiments may be useful for IoT, Fog, or Edge model of computing. In one example of such embodiments, the subject resource 104 may be a gateway or aggregator device in a fog system (see e.g., discussion of FIGS. 8-11 infra) that is configured to determine trust relationships for the Fog/Edge nodes in the fog system. In another example of such embodiments, the subject resource 104 is an autonomic device (e.g., an autonomous camera) that is used to monitor an analog device (e.g., a pressure meter or fluid level meter in a factory or refinery).

Continuing with the example of FIG. 2, the policy manager 206 is configured to store policies 226 for the operation of the subject resource 104 and/or for the risk/trust level assessments discussed herein. The policies 226 define a set of rules that govern the behavior of the trust management system 200 and/or the subject resource 104. In various embodiments, one or more of the policies 226 define criteria to be used by the neighbor trust level evaluator 209 for determining trust levels, risk levels, and the like from the situation information and/or context information. This criteria may include, for example, algorithms, weight factors for individual pieces of data, analysis techniques/functions, system rules, policy definitions, machine learning models/algorithms, etc. In some embodiments, the policies 226 may include executable code, which can include software modules or computational logic which, when operated by the neighbor trust level evaluator 209, analyzes the situation information and/or context information for the trust zone assignment or trust level calculation. In some embodiments, the policies 226 may define one or more actions and the conditions under which the actions are executed. For example, a policy 226 may define actions that the resource 104 should take when a certain trust or risk level is calculated. In these embodiments, the policy 226 may include the necessary instructions or commands for operating the resource 104, sensors 221, EMCs 224, or the like. In some embodiments, the policies 226 may define permissions for sharing data with other resources 104/230 or otherwise granting access to the subject resource 104, which may be based on permissions set for different trust zones, trust levels, and/or capabilities of the subject resource 104.

The policies 226 may be formed of any of the programming languages, markup languages, schema languages, etc. discussed herein. In some embodiments, the policies 226 comprise documents or data structures in a format that can be interpreted by the subsystems of trust management system 200, such as XML (or any variation thereof), JSON, markdown (or any variation thereof), IFTTT ("If This Then That"), PADS markup language (PADS/ML), routing policy language (RPL), Click router configuration language, Nettle, and/or some other suitable data format. The documents or data structures that make up the policies 226 may be developed or defined by an owner/operator of the subject resource 104. In one example, a developer may write the policies using a suitable development tool/environment and/or in any combination of one or more programming languages, such as those discussed herein. In another example, the policies 226 may be generated by an application implemented by the servers 240 based on various selections within a user interface or the like. The documents or data structures of the policies 226 may comprise a "description," which is collections of software modules, program code, logic blocks, parameters, rules, conditions, etc. that may be used by one or more subsystems of the trust management system 200 to control and/or monitor the sensors 221 and/or EMCs 224, as well as share data with various resources 104/230.

In some embodiments, the subsystems of the trust management system 200 are implemented as AI agents, which are autonomous entities configured to observe environmental conditions and determine actions to be taken in furtherance of a particular goal and based on learnt experience (e.g., empirical data). The particular environmental conditions to be observed, the actions to taken, utility measures, etc., may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain conditions or characteristics.

In embodiments, the AI agents are implemented as autonomous software agents, implemented using individual hardware elements, or a combination thereof. In an example software-based implementation, the AI agents may be developed using a suitable programming language, development tools/environments, etc., which are executed by one or more processors of the subject resource 104. In this example, program code of the AI agents may be executed by a single processor or by individual processing devices. In an example hardware-based implementation, each AI agent is implemented in a respective hardware accelerator (e.g., FPGA, ASIC, etc.) that are configured with appropriate bit stream(s) or logic blocks to perform their respective functions. The aforementioned processor(s) and/or hardware accelerators may be specifically tailored for operating AI agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., NVIDIA PX™ based GPUs, Hardware 3 provided by Tesla®, Inc., or the like. In embodiments, individual AI agents are configured to control respective subsystems of the subject resource 104, some of which may involve the use of one or more EMCs 224 and/or one or more sensors 221. In these embodiments, the actions to be taken and the particular goals to be achieved may be specific or individualized based on the subsystem itself. Additionally, some of the actions or goals may include non-resource operation related tasks depending on the particular context in which an AI agent is implemented.

To observe environmental conditions, the AI agents are configured to receive, or monitor for, sensor data from sensors 221 and sensor 220 via intra-resource communication subsystem 210, and to receive EMC data from the EMCs 224 of the subject resource 104 via intra-resource communication subsystem 210. The act of monitoring may include capturing CSD and/or sensor data from individual sensors 221 and EMCs 224. Monitoring may include polling (e.g., periodic polling, sequential (roll call) polling, etc.) one or more sensors 221 for sensor data and/or one or more EMCs 224 for EMC data for a specified/selected period of time. In other embodiments, monitoring may include sending a request or command for sensor/EMC data in response to an external request for sensor/EMC data. In some embodiments, monitoring may include waiting for sensor/EMC data from various sensors/EMCs based on triggers or events, such as when the subject resource 104 reaches predetermined speeds and/or distances in a predetermined amount of time (with or without intermitted stops). The events/triggers may be AI agent specific, and may vary depending of a particular embodiment. In some embodiments, the monitoring may be triggered or activated by an application or subsystem of the trust management system 200 or by a remote device, such as or server(s) 240 or observed resource(s) 230.

In some embodiments, one or more of the AI agents may be configured to process the sensor data and EMC data to identify internal and/or external environmental conditions upon which to act. Examples of the sensor data may include, but are not limited to, image data from one or more image capture devices; sensor data from MEMS/NEMS or IMUs of the subject resource 104 providing speed, acceleration, and tilt data of the subject resource 104; audio data provided by microphones; and/or other like sensor data discussed in more detail with regard to FIG. 6. Examples of the CSD may are discussed in more detail with regard to FIG. 6. In an example, when the neighbor trust level evaluator 209 is an AI agent, this AI agent may be configured to process images captured by sensors 221 (image capture devices) and/or assessed situation information identified by the neighbor observer 205 to determine a state or condition of the surrounding area (e.g., existence of resources 230). In another example, when the system monitor 204 is an AI agent, this AI agent may be configured to process sensor/EMC data provided by one or more sensors 221 and/or EMCs 224 to determine a current operational state of the subject resource 104. The AI agents may also be configured to compare the sensor data and/or EMC data with training set data to determine or contribute to determining conditions for evaluating trust and/or risk levels. For example, when the neighbor trust level evaluator 209 is an AI agent, this AI agent may be configured to compare the sensor data and/or EMC data with empirical data stored by the subject resource 104 and/or servers 240 to refine how and when to assign certain observed resources 230 to a particular trust zone.

To determine actions to be taken in furtherance of a particular goal, each of the AI agents are configured to identify a current state of the trust management system 200, the subject resource 104, and/or the AI agent itself, identify or obtain one or more models, identify or obtain goal information, and predict a result of taking one or more actions based on the current state, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the trust management system 200, or a measure of various conditions in the trust management system 200 or one or more other systems of the subject resource 104. The current state can also be the context information discussed previously. The current state is stored inside an AI agent and is maintained in a suitable data structure. The AI agents are configured to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the trust management system 200 to perform one or more actions determined to lead to the selected outcome. In addition, the AI agents may also include a learning module configured to learn from an experience with respect to the selected outcome and some performance measure(s). The experience may include sensor data and/or new state (context) data collected after performance of the one or more actions of the selected outcome. The learnt experience may be used to produce new or updated models for determining future actions to take. According to various embodiments, the AI agents may provide, with the assistance of intra-resource communication subsystem 210, the one or more models, goal information, and/or the learnt experience to the policy manager 206, wherein the policy manager 206 is configured to generate new policies 226 or update an existing policies 226 to include the one or more models, goal information, and/or the learnt experience.

As alluded to earlier, intra-resource communication subsystem 210 is configured to facilitate intra vehicle communication between trust manager 202, sensors 221, EMCs 224, and the various subsystems of the trust management system 200, as well as other sensors of other resources 104. In particular, intra-resource communication subsystem 210 is configured to receive data from sensors 221 and EMCs 224, and transmit commands to sensors 221 and EMCs 224 for operation/control of the subject resource 104. Example of commands to sensors 221 may include, but are not limited to, calibration commands, commands to collect certain sensor data that are collected on demand (as opposed to being collected continuously or on a periodic basis), and/or commands to change a position or orientation of a particular sensor 221 (e.g., change a camera angle or view). In these embodiments, intra-resource communication subsystem 210 is coupled with sensors 221 and EMCs 224 via a suitable vehicle bus or interconnect (IX) technology, and is configured to communicate (i.e., send and receive messages/signaling) over the bus/IX using a corresponding bus/IX protocol. Examples of such vehicle bus/IX technologies may include a Controller Area Network (CAN), a Time-Trigger Protocol (TTP) system, a FlexRay system, or the like. Additionally or alternatively, any number of other bus/IX technologies may be used, such as a Local Interconnect Network (LIN); industry standard architecture (ISA); extended ISA (EISA); peripheral component interconnect (PCI); PCI express (PCIe); Inter-Integrated Circuit (I2C) bus; Parallel Small Computer System Interface (SPI) bus; point-to-point interfaces; a power bus; a proprietary bus, for example, used in a SoC based interface; or any number of other technologies, such as those discussed herein. In some embodiments, intra-resource communication subsystem 210 is communicatively coupled with other sensors of other resources 104 via a wireless network, such as a PAN or P2P network, and is configured to communicate in accordance with a corresponding wireless network protocol, such as the PAN and/or P2P protocols discussed herein.

In some embodiments, the intra-resource communication subsystem 210 is also configured to facilitate intra-resource communication between the various subsystems of the trust management system 200 and/or other subsystems of the resource 104 using suitable drivers, libraries, application programming interfaces (APIs), middleware, software connectors, software glue, and/or the like. For example, in order to compile system information, the system monitor 204 is configured to utilize the intra-resource communication subsystem 210 to interface with individual hardware and software elements implemented by the subject resource 104. The system monitor 204 is also configured to utilize the intra-resource communication subsystem 210 to provide the compiled system information to the trust manager 202 and/or the neighbor trust level evaluator in accordance with the various embodiments herein.

As alluded to earlier, remote communication subsystem 214 is configured to facilitate communication with one or more remote servers 240. The remote servers 240 may be one or more servers affiliated with a mobile network operator, a service provider platform, cloud computing service, vehicular traffic management service, content streaming service, interactive gaming service, an insurance company, emergency response services (e.g., first responders, fire, ambulance, etc.), a law enforcement or governmental agency, a news gathering/reporting agency, an environmental data service, and so forth. In some embodiments, remote communication subsystem 214 is configured to communicate with servers 240 wirelessly, via a wide area network, such as the Internet or an enterprise network. Wireless communication may be WiFi or cellular, such as LTE, 5G, WiMAX, etc.

As alluded to earlier, the various entities of the trust management system 200 may be implemented as individual software agents (e.g., artificial intelligence (AI) agents) or as individual companion silicon or circuitry (e.g., individual FPGAs, ASICs, etc.). In either embodiment, each of trust manager 202, system monitor 204, neighbor observer 205, policy manager 206, neighbor authenticator 207, and neighbor trust level evaluator 209 may include one or more trained neural networks in performing their respective determinations and/or assessments. An example of such neural networks is shown by FIG. 7.

Figure 7:
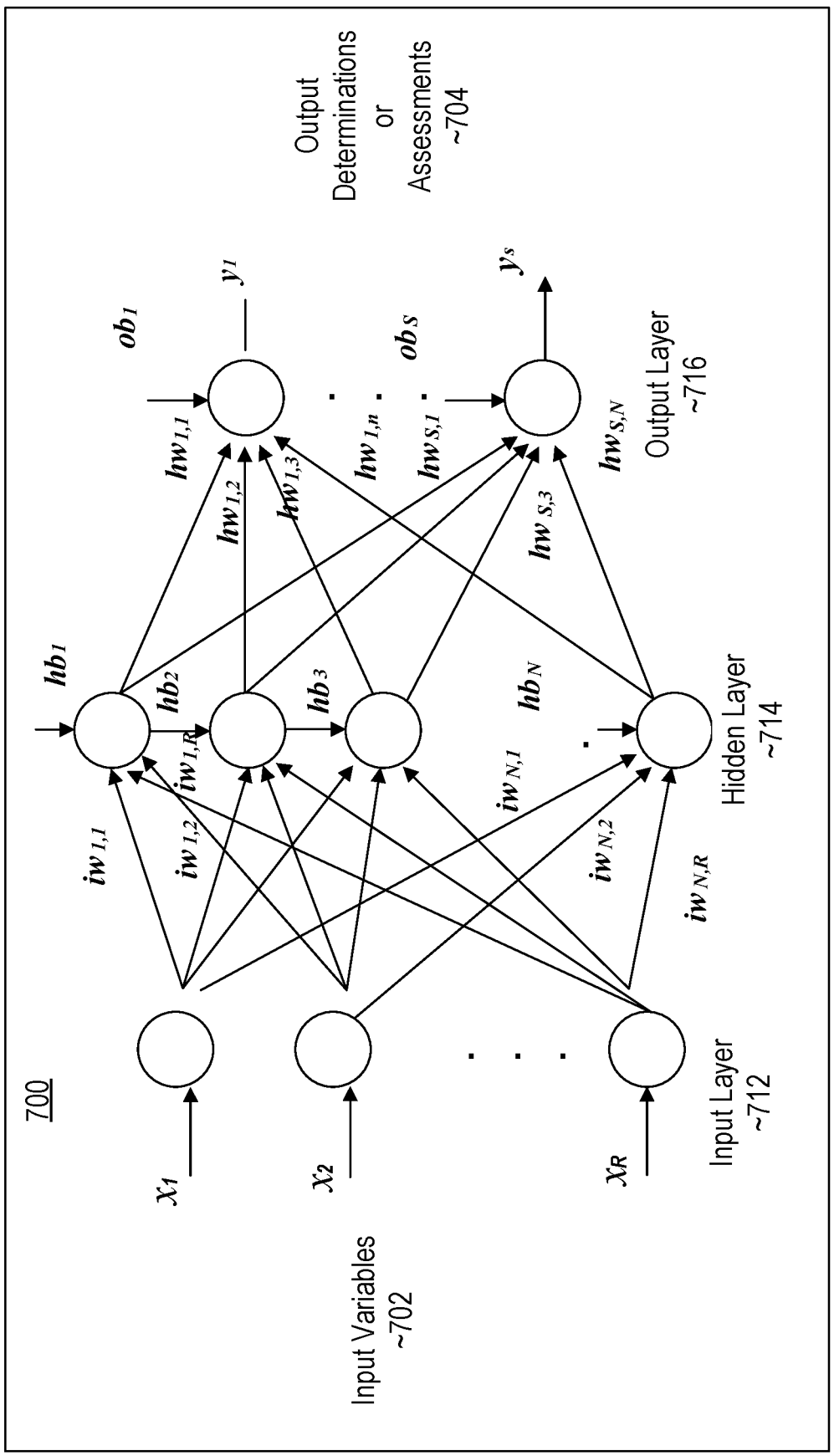
FIG. 7 illustrates an example neural network suitable for use with present disclosure, according to various embodiments.

FIG. 7 illustrates an example neural network, in accordance with various embodiments. As shown, example neural network 700 may be a multilayer feedforward neural network (FNN) comprising an input layer 712, one or more hidden layers 714 and an output layer 716. Input layer 712 receives data of input variables ($x_i$) 702. Hidden layer(s) 714 processes the inputs, and eventually, output layer 716 outputs the determinations or assessments ($y_i$) 704. In one example implementation the input variables ($x_i$) 702 of the neural network are set as a vector containing the relevant variable data, while the output determination or assessment ($y_i$) 704 of the neural network are also as a vector.

Multilayer feedforward neural network (FNN) may be expressed through the following equations:

$$ho_i = f(\Sigma_{j=1}^{R}(iw_{i,j}x_j) + hb_i), \text{ for } i=1, \ldots, N$$

$$y_i = f(\Sigma_{k=1}^{N}(hw_{i,k}ho_k) + ob_i), \text{ for } i=1, \ldots, S$$

where $ho_i$ and $y_i$ are the hidden layer variables and the final outputs, respectively. f( ) is typically a non-linear function, such as the sigmoid function or rectified linear (ReLu) function that mimics the neurons of the human brain. R is the number of inputs. N is the size of the hidden layer, or the number of neurons. S is the number of the outputs.

The goal of the FNN is to minimize an error function E between the network outputs and the desired targets, by adapting the network variables iw, hw, hb, and ob, via training, as follows:

$$E = \Sigma_{k=1}^{m}(E_k), \text{ where } E_k = \Sigma_{p=1}^{S}(t_{kp} - y_{kp})^2$$

where $y_{kp}$ and $t_{kp}$ are the predicted and the target values of pth output unit for sample k, respectively, and m is the number of samples.

In some embodiments, neighbor trust level evaluator 209 may include a trained neural network 700 to determine when and how to evaluate situation information and/or context information to calculate trust levels and/or to assign observed resources 104/230 to respective trust zones. The input variables ($x_i$) 702 may include the readings of the various sensors 221 and EMC data from various EMCs 224, various messages or data received from observed resource(s) 104/230, and/or data/information received from other subsystems of the subject resource 104. The output variables ($y_i$) 704 may include Boolean values indicating true or false for whether an observed resource 104/230 should be evaluated, values indicating the assigned trust zone(s) for observed resource(s) 104/230, and/or values indicating calculated trust level(s) for observed resource(s) 104/230.

In some embodiments, system monitor 204 may include a trained neural network 700 to determine how to generate context information based on various system information obtained from subsystems of the subject resource 104. In these embodiments, the input variables ($x_i$) 702 may include system information obtained from the subsystems, and the output variables ($y_i$) 704 may include values indicating selection or non-selection of individual pieces of the system information for inclusion in the context information.

In some embodiments, neighbor observer 205 may include a trained neural network 700 to assess condition of the immediate surrounding area of the subject resource 104.

The input variables ($x_i$) 702 may include sensor data representative of an observed resource 104/230 (e.g., LIDAR readings, objects recognized in one or more captured images, etc.), and/or sensor data received from observed resource(s) 230, infrastructure, and/or remote servers 240. The output variables ($y_i$) 704 may include values indicating vector data (e.g., approach type, approach rate, etc.) of the observed resource 104/230.

In some embodiments, each of the AI agents may include respective trained neural networks 700 to determine an optimal outcome to take based on a current state of the subject resource 104 and/or the AI agents themselves. The input variables ($x_i$) 702 may include sensor data from various sensors 221, sensor data received from observed resource(s) 230, infrastructure, and/or remote servers 240, EMC data from various EMCs 224, information/data from other subsystems in the subject resource 104, information/data from various applications running in/on the system 200 or subject resource 104, one or more relevant models, current state information, goal information, and/or any other suitable information/data. The output variables ($y_i$) 704 may include particular actions to take, which may be in the form of commands/signals to be sent to different subsystems, sensors 221, and/or EMCs 224 of the subject resource 104, messages/data to be sent to observed resource(s) 104/230, messages/data to be sent to remote servers 240, and/or the like.

In this example, for simplicity of illustration, there is only one hidden layer in the neural network. In some other embodiments, there can be many layers of hidden layers. Furthermore, the neural network can be in some other types of topology, such as Convolution Neural Network (CNN) or Recurrent Neural Network (RNN).

Referring back to FIG. 2, each of trust manager 202, system monitor 204, neighbor observer 205, policy manager 206, neighbor authenticator 207, neighbor trust level evaluator 209, intra-resource communication subsystem 210, inter-resource communication subsystem 212, and remote communication subsystem 214 may be implemented in hardware, software, or combination thereof. Example hardware implementations may include by are not limited to application specific integrated circuit (ASIC) or programmable circuits (such as Field Programmable Gate Arrays (FPGA)) programmed with the operational logic. Software implementations may include implementations in instructions of instruction set architectures (ISA) supported by the target processors, or any one of a number of high level programming languages that can be compiled into instruction of the ISA of the target processors. In some embodiments, especially those embodiments where either controller 202 or one of subsystems 204-209 includes at least one neural network, at least a portion of trust manager 202 and subsystems 204, 205, 206, 207, and/or 209 may be implemented in an accelerator. An example hardware computing platform will be further described later with references to FIG. 6.

Figure 3:
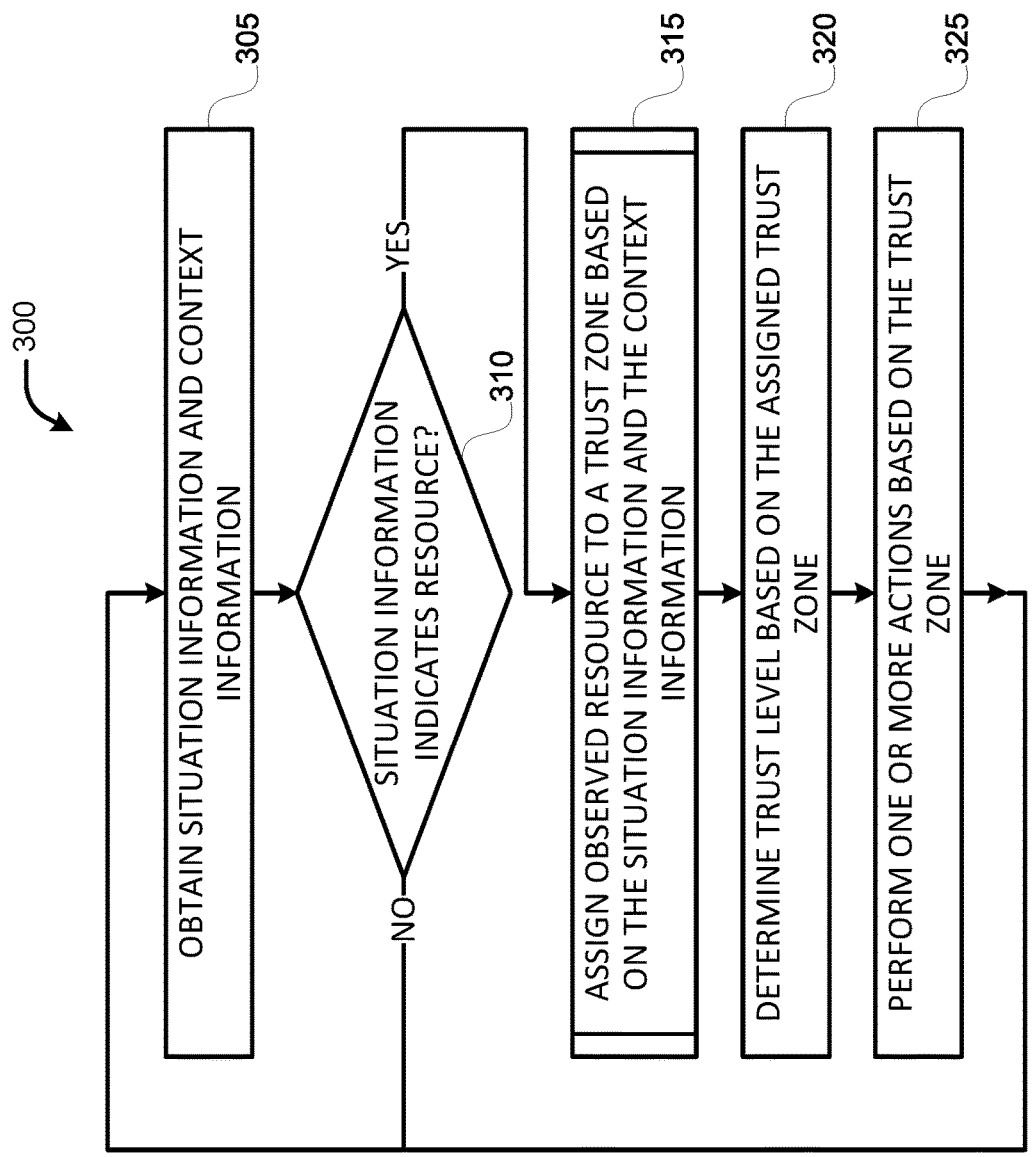
FIGS. 3-5 shows example trust management processes, in accordance with various embodiments.
Figure 4:
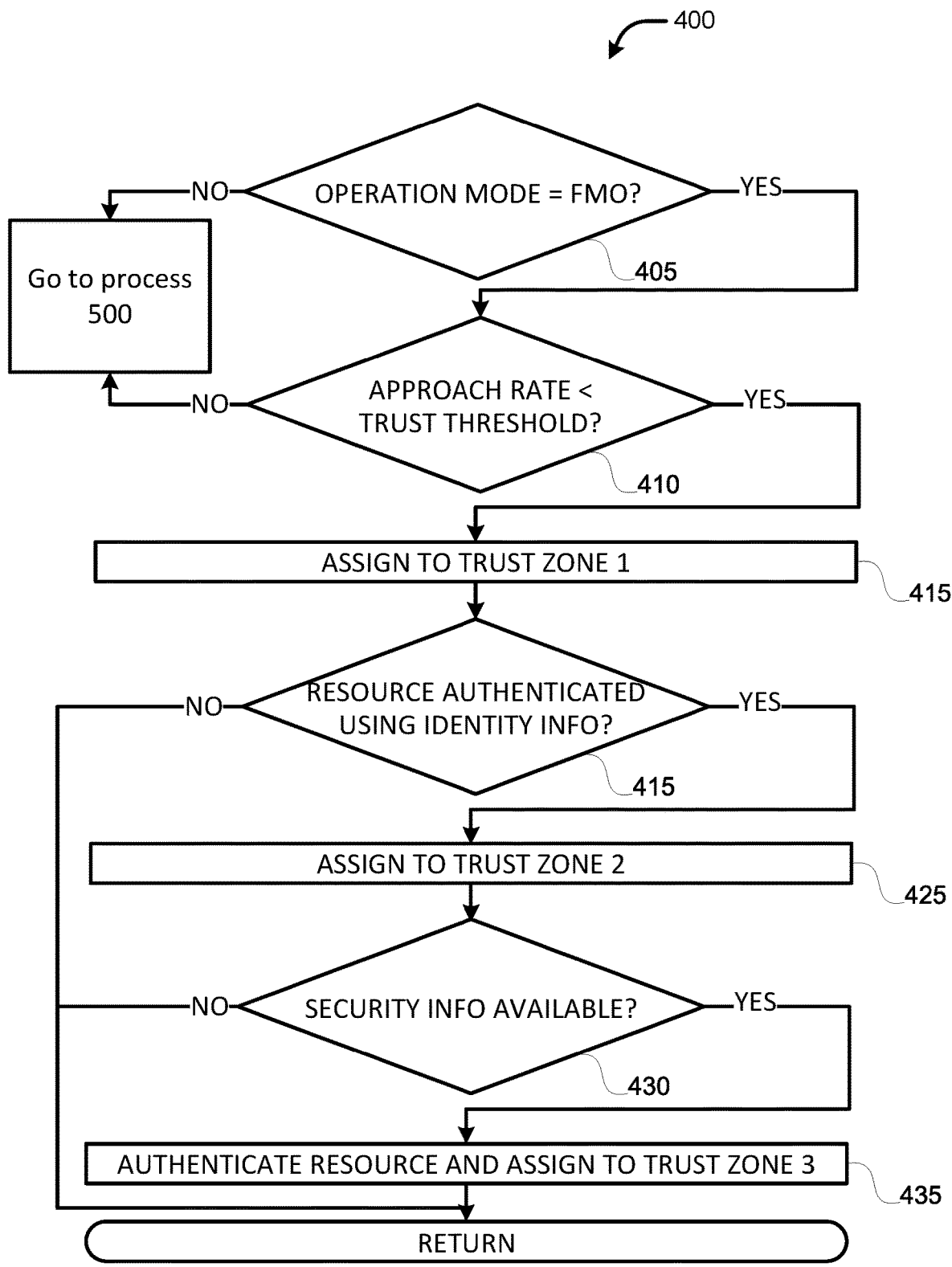
Figure 5:
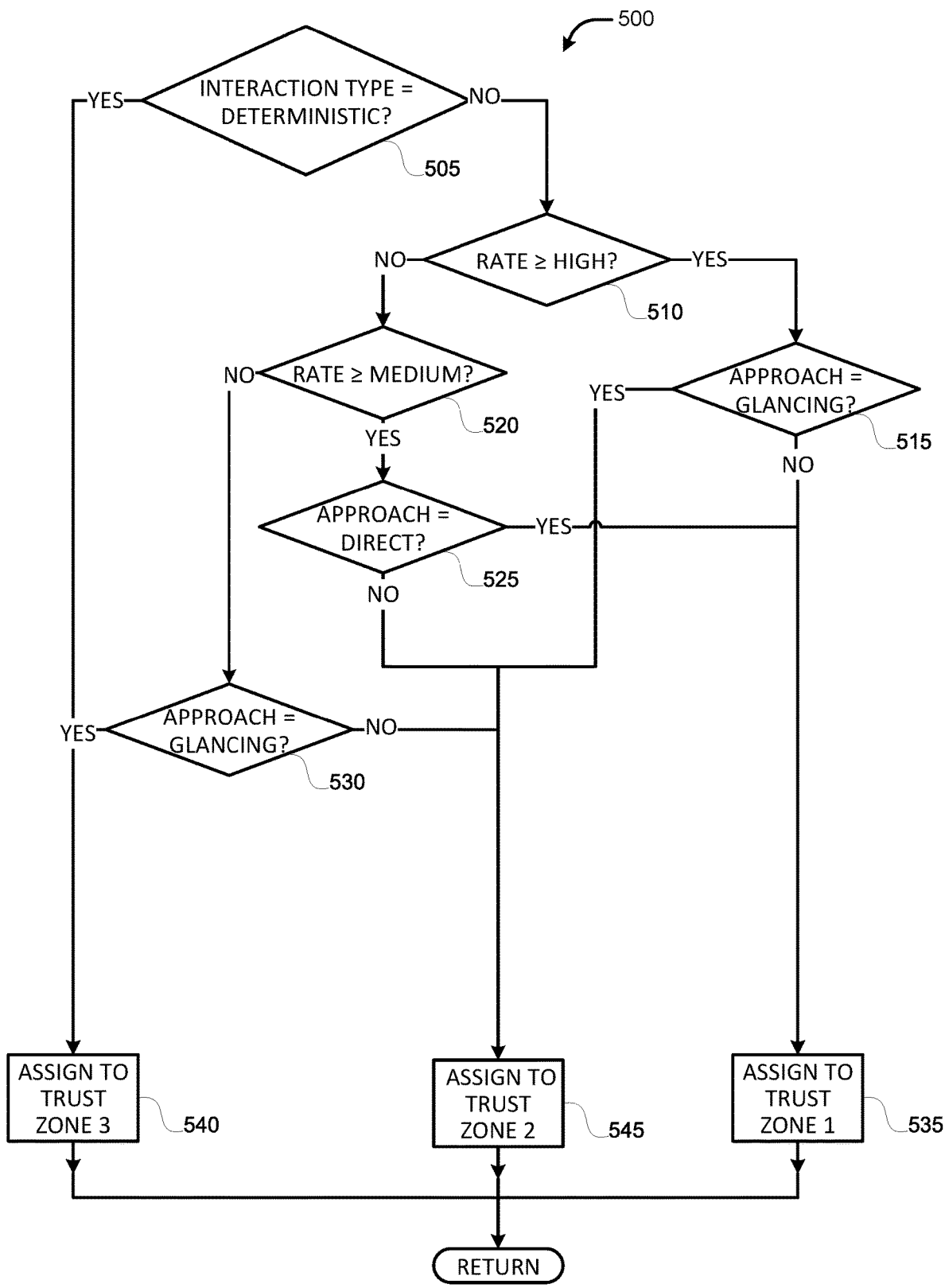

FIGS. 3-5 shows example trust management processes 300-500, respectively, in accordance with various embodiments. For illustrative purposes, the various operations of processes 300-500 is described as being performed by various subsystems of the trust management system 200 of FIG. 2, which is implemented by a subject resource 104. While particular examples and orders of operations are illustrated FIGS. 3-5, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 300 begins at operation 305 where the neighbor trust level evaluator 209 (hereinafter "evaluator 209") obtains situation information and context information from the trust manager 202. As mentioned previously, the situation information may be provided to the trust manager 202 by the neighbor observer 205, and may be representative of one or more observed resource(s) 104/230 near or proximate to the subject resource 104. At operation 310, the evaluator 209 determines whether the situation information indicates that an observed resource 104/230 is near or proximate to the subject resource 104. The context information (or portions thereof) may be provided to the trust manager 202 by the system monitor 204 and/or neighbor authenticator 207. The context information provided by the system monitor 204 may indicate a system context and/or current state of operation of the subject resource 104 (or current state of operation of individual components of the subject resource 104). The context information provided by the neighbor authenticator 207 may indicate whether the observed resources 104/230 have been authenticated, as well as the information used to authenticate the observed resources 104/230. This context information may also be indicative of whether the subject resource 104 has a preexisting relationship with the observed resources 104/230.

If at operation 310 the evaluator 209 determines that the situation information does not indicate that an observed resource 104/230 is near or proximate to the subject resource 104, then the evaluator 209 proceeds to back to operation 305 to obtain new situation and context information. If at operation 310 the evaluator 209 determines that the situation information indicates that an observed resource 104/230 is near or proximate to the subject resource 104, then the evaluator 209 proceeds to operation 315 to assign the observed resource 104/230 to a trust zone based on the situation information and the context information. In alternative embodiments, the evaluator may only obtain situation information at operation 305, and may then obtain context information after the evaluator 209 determines that there is an observed resource 104/230 near or proximate to the subject resource 104. Operation 315 is discussed in more detail infra with respect to FIG. 4.

At operation 320, the evaluator 209 determines a trust level for the observed resource 104/230 based on the assigned trust zone. In some embodiments, there may be a one-to-one correspondence between trust levels and trust zones wherein a first trust zone corresponds to a first trust level, a second trust zone corresponds to a second trust level, and so forth. In other embodiments, in addition to the assigned trust zone, the evaluator 209 may consider other factors and/or criteria, which may be based on empirical data, when determining the trust level. In some embodiments, the evaluator 209 may refer to one or more policies 226 stored by the policy manager 206 to identify the relevant factors/criteria for determining the trust level. At operation 325, the trust manager 202 may determine one or more actions to be performed based on the determined trust level. In some embodiments, the trust manager 202 may refer to one or more policies 226 stored by the policy manager 206 to identify the relevant actions to be performed based on the trust level. After performance of operation 325, process 300 may end or repeat as necessary.

FIG. 4 shows process 400 for assigning an observed resource 104 to a trust zone when operating in a Fog/Edge Node Mode of Operation (FMO), in accordance with various embodiments. In embodiments, process 400 corresponds to operation 315 of process 300 discussed previously. Process 400 begins at operation 405 where the evaluator 209 determines whether the current mode of operation is the Fog/Edge Node Mode of Operation (FMO). If at operation 405 the evaluator 209 determines that the current mode of operation is not the FMO (or determines that the current mode of operation is the Analog Mode of Operation (AMO)), then the evaluator 209 proceeds to perform process 500 shown and described with regard to FIG. 5. If at operation 405 the evaluator 209 determines that the current mode of operation is the FMO (or determines that the current mode of operation is not the AMO), then the evaluator 209 proceeds to operation 410 to determine whether an approach rate of the observed resource 104/230 is less than a trust threshold. The trust threshold may be a predetermined or preconfigured speed/velocity value, or the trust threshold may be adapted based on empirical data.

If at operation 410 the evaluator 209 determines that the approach rate of the observed resource 104/230 is not less than the trust threshold (or determines that the approach rate is greater than or equal to the trust threshold), then the evaluator 209 proceeds to perform process 500 shown and described with regard to FIG. 5. If at operation 410 the evaluator 209 determines that the approach rate of observed resource 104/230 is less than the trust threshold, then the evaluator 209 proceeds to operation 415 to assign the observed resource 104/230 to a first trust zone (TZ1).

The evaluator 209 then proceeds to operation 420 to determine whether the neighbor authenticator 207 has been able to authenticate the observed resource 104/230 using identification information. If at operation 420 the evaluator 209 determines that the neighbor authenticator 207 has not been able to authenticate the observed resource 104/230 using identification information, then the evaluator 209 returns back to process 300 of FIG. 3. If at operation 420 the evaluator 209 determines that the neighbor authenticator 207 has been able to authenticate the observed resource 104/230 using identification information, then the evaluator 209 proceeds to operation 425 to assign the observed resource 104/230 to a second trust zone (TZ2).

The evaluator 209 then proceeds to operation 430 to determine whether the neighbor authenticator 207 has been able to authenticate the observed resource 104/230 using security information. If at operation 430 the evaluator 209 determines that the neighbor authenticator 207 has not been able to authenticate the observed resource 104/230 using security information, then the evaluator 209 returns back to process 300 of FIG. 3. If at operation 430 the evaluator 209 determines that the neighbor authenticator 207 has been able to authenticate the observed resource 104/230 using security information, then the evaluator 209 proceeds to operation 435 to assign the observed resource 104/230 to a third trust zone (TZ3). After performance of operation 435, the evaluator 209 returns back to process 300 of FIG. 3, for example, to perform operation 320 as discussed previously.

FIG. 5 shows process 500 for assigning an observed resource 104 to a trust zone when operating in an Analog Mode of Operation (AMO), in accordance with various embodiments. In embodiments, process 500 may be performed based on the outcome of operation 405 or 410 of process 400 discussed previously. Process 500 begins at operation 505 where the evaluator 209 determines whether a predicted interaction type is a deterministic interaction. If at operation 505 the evaluator 209 determines that the predicted interaction type is a deterministic interaction (or determines that the predicted interaction type is not a probabilistic interaction), the evaluator 209 proceeds to operation 540 to assign the observed resource 104/230 to the third trust zone (TZ3). If at operation 505 the evaluator 209 determines that the predicted interaction type is not a deterministic interaction (or determines that the predicted interaction type is a probabilistic interaction), then the evaluator 209 proceeds to operation 510 to determine whether the approach rate (e.g., speed/velocity) is greater than or equal to a high approach rate threshold.

If at operation 510 the evaluator 209 determines that the approach rate (e.g., speed/velocity) is greater than or equal to a high approach rate threshold, then the evaluator 209 proceeds to operation 515 to determine whether the approach type is a glancing approach. If at operation 515 the evaluator 209 determines that the approach type is a glancing approach, then the evaluator 209 proceeds to operation 545 to assign the observed resource 104/230 to the second trust zone (TZ2). If at operation 515 the evaluator 209 determines that the approach type is not a glancing approach (or determines that the approach type is a direct approach or an indirect approach), then the evaluator 209 proceeds to operation 535 to assign the observed resource 104/230 to the first trust zone (TZ3).

Referring back to operation 510, if at operation 510 the evaluator 209 determines that the approach rate (e.g., speed/velocity) is not greater than or equal to the high approach rate threshold, then the evaluator 209 proceeds to operation 520 to determine whether the approach rate (e.g., speed/velocity) is greater than or equal to a medium approach rate threshold. If at operation 520 the evaluator 209 determines that the approach rate (e.g., speed/velocity) is not greater than or equal to the medium approach rate threshold, then the evaluator 209 proceeds to operation 530 to determine whether the approach type is a glancing approach. If at operation 530 the evaluator 209 determines that the approach type is a glancing approach, then the evaluator 209 proceeds to operation 540 to assign the observed resource 104/230 to the TZ3. If at operation 530 the evaluator 209 determines that the approach type is not a glancing approach (or determines that the approach type is a direct approach or an indirect approach), then the evaluator 209 proceeds to operation 545 to assign the observed resource 104/230 to the TZ2.

Referring back to operation 520, if at operation 520 the evaluator 209 determines that the rate is greater than or equal to the medium approach rate threshold, then the evaluator 209 proceeds to operation 525 to determine whether the approach type is a direct approach. If at operation 525 the evaluator 209 determines that the approach type is not a direct approach (or determines that the approach type is an indirect approach or a glancing approach), then the evaluator 209 proceeds to operation 545 to assign the observed resource 104/230 to the TZ2. If at operation 525 the evaluator 209 determines that the approach type is a direct approach, then the evaluator 209 proceeds to operation 535 to assign the observed resource 104/230 to the TZ1. After operation of one of operations 535, 540, or 545, the evaluator 209 returns back to process 300 of FIG. 3, for example, to perform operation 320 as discussed previously.

II. Example Implementations

FIG. 6 illustrates an example of an architecture 600 (also referred to as "platform 600," "device 600," "appliance 600," or the like) in accordance with various embodiments. The architecture 600 may be suitable for use as any of the computer devices discussed herein. Architecture 600 may also be implemented in or as a server computer system or some other element, device, or system discussed herein. The architecture 600 may include any combinations of the components shown in the example. The components of architecture 600 may be implemented as integrated circuits (ICs), portions thereof, discrete electronic devices, or other modules, logic, hardware, software, firmware, or a combination thereof adapted in the computer architecture 600, or as components otherwise incorporated within a chassis of a larger system. The example of FIG. 6 is intended to show a high level view of components of the computer architecture 600. However, some of the components shown may be omitted, additional components may be present, and different arrangement of the components shown may occur in other implementations.

The architecture 600 includes processor circuitry 602. The processor circuitry 602 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 602 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 602 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 602 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 602 may be coupled with or may include memory/storage and may be configured to execute instructions stored in the memory/storage to enable various applications or operating systems to run on the architecture 600. In these embodiments, the processors (or cores) of the processor circuitry 602 is configured to operate application software to provide a specific service to a user of the architecture 600. In some embodiments, the processor circuitry 602 may be a special-purpose processor/controller to operate according to the various embodiments herein.

As examples, the processor circuitry 602 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Ryzen® processor(s), Accelerated Processing Units (APUs), MxGPUs, Epyc® processor(s), or the like; A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the processor circuitry 602 may be a part of a system on a chip (SoC), System-in-Package (SiP), a multi-chip package (MCP), and/or the like, in which the processor circuitry 602 and other components are formed into a single integrated circuit, or a single package, such as the Edison™ or Galileo™ SoC boards from Intel® Corporation. Other examples of the processor circuitry 602 are mentioned elsewhere in the present disclosure.

Additionally or alternatively, processor circuitry 602 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 602 may comprise logic blocks or logic fabric including and other interconnected resources that may be programmed to perform various functions, such as the procedures, methods, functions, etc. of the various embodiments discussed herein. In such embodiments, the circuitry of processor circuitry 602 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 602 may communicate with system memory circuitry 604 over an interconnect 606 (e.g., a bus). Any number of memory devices may be used to provide for a given amount of system memory. As examples, the memory circuitry 604 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 604 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 604 may also comprise persistent storage devices, which may be temporal and/or persistent storage of any type, including, but not limited to, non-volatile memory, optical, magnetic, and/or solid state mass storage, and so forth.

The individual memory devices of memory circuitry 604 may be implemented as one or more of solder down packaged integrated circuits, socketed memory modules, and plug-in memory cards. The memory circuitry 604 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 604. In embodiments, the memory circuitry 604 may be disposed in or on a same die or package as the processor circuitry 602 (e.g., a same SoC, a same SiP, or soldered on a same MCP as the processor circuitry 602).

To provide for persistent storage of information such as data, applications, operating systems (OS), and so forth, a storage circuitry 608 may also couple to the processor circuitry 602 via the interconnect 606. In an example, the storage circuitry 608 may be implemented via a solid-state disk drive (SSDD). Other devices that may be used for the storage circuitry 608 include flash memory cards, such as SD cards, microSD cards, xD picture cards, and the like, and USB flash drives. In low power implementations, the storage circuitry 608 may be on-die memory or registers associated with the processor circuitry 602. However, in some examples, the storage circuitry 608 may be implemented using a micro hard disk drive (HDD). Further, any number of new technologies may be used for the storage circuitry 608 in addition to, or instead of, the technologies described, such resistance change memories, phase change memories, holographic memories, or chemical memories, among others.

The storage circuitry 608 store computational logic 683 (or "modules 683") in the form of software, firmware, or hardware commands to implement the techniques described herein. In some embodiments, the computational logic 683 includes various modules that correspond to the entities of the trust management system 200 of FIG. 2, including the trust manager 202, system monitor 204, neighbor observer 205, policy manager 206, neighbor authenticator 207, and neighbor trust level evaluator 209. The computational logic 683 may be employed to store working copies and/or permanent copies of programming instructions for the operation of various components of architecture 600 (e.g., drivers, etc.), an operating system of architecture 600, one or more applications, and/or for carrying out the embodiments discussed herein (such as one or more operations of FIGS. 3-5). The computational logic 683 may be stored or loaded into memory circuitry 604 as instructions 682 for execution by the processor circuitry 602 to provide the functions described herein. The various elements may be implemented by assembler instructions supported by processor circuitry 602 or high-level languages that may be compiled into such instructions (e.g., instructions 670). The permanent copy of the programming instructions may be placed into persistent storage devices of storage circuitry 608 in the factory or in the field through, for example, a distribution medium (not shown), through a communication interface (e.g., from a distribution server (not shown)), or over-the-air (OTA).

Although the instructions 682 are shown as code blocks included in the memory circuitry 604 and the computational logic 683 is shown as code blocks in the storage circuitry 608, it should be understood that any of the code blocks may be replaced with hardwired circuits, for example, built into an FPGA, ASIC, or some other suitable circuitry. For example, where processor circuitry 602 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 604 and/or storage circuitry 608 may store program code of an operating system (OS), which may be a general purpose OS or an OS specifically written for and tailored to the computing architecture 600. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "μC/OS") provided by Micrium®, Inc., FreeRTOS, VxWorks® provided by Wind River Systems, Inc.®, PikeOS provided by Sysgo AG®, Android Things® provided by Google QNX® RTOS provided by BlackBerry Ltd., or any other suitable RTOS, such as those discussed herein.

The OS may include one or more drivers that operate to control particular devices that are embedded in the architecture 600, attached to the architecture 600, or otherwise communicatively coupled with the architecture 600. The drivers may include individual drivers allowing other components of the architecture 600 to interact or control various input/output (I/O) devices that may be present within, or connected to, the architecture 600. For example, the drivers may include a display driver to control and allow access to a display device, a touchscreen driver to control and allow access to a touchscreen interface of the architecture 600, sensor drivers to obtain sensor readings of sensor circuitry 621 and control and allow access to sensor circuitry 621, EMC drivers to obtain actuator positions of the EMCs 622 and/or control and allow access to the EMCs 622, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the architecture 600 (not shown).

In an example, the instructions 682 provided via the memory circuitry 604 and/or the storage circuitry 608 are embodied as a non-transitory, machine-readable medium S60 including code to direct the processor circuitry 602 to perform electronic operations in the architecture 600. The processor circuitry 602 accesses the non-transitory machine-readable medium 660 over the interconnect 606. For instance, the non-transitory, machine-readable medium 660 may be embodied by devices described for the storage circuitry 608 of FIG. 6 or may include specific storage units such as optical disks, flash drives, or any number of other hardware devices. The non-transitory, machine-readable medium 660 may include instructions 682 to direct the processor circuitry 602 to perform a specific sequence or flow of actions, for example, as described with respect to the flowchart(s) and block diagram(s) of operations and functionality depicted previously (see e.g., FIGS. 3-5). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

The computer program code for carrying out operations of the present disclosure (e.g., computational logic 683, instructions 682, 670, etc.) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

The components may communicate over the interconnect 606. The interconnect 606 may include any number of technologies, including industry standard architecture (ISA), extended ISA (EISA), peripheral component interconnect (PCI), peripheral component interconnect extended (PCIx), PCI express (PCIe), or any number of other technologies. The interconnect 606 may be a proprietary bus, for example, used in a SoC based system. Other bus systems may be included, such as an I²C interface, an SPI interface, point-to-point interfaces, and a power bus, among others.

The interconnect 606 couples the processor circuitry 602 to the communication circuitry 609 for communications with other devices. The communication circuitry 609 is a hardware element, or collection of hardware elements, used to communicate over one or more networks (e.g., cloud 601) and/or with other devices (e.g., mesh devices/fog 664). The communication circuitry 609 includes baseband circuitry 610 (or "modem 610") and radiofrequency (RF) circuitry 611 and 612.

The baseband circuitry 610 includes one or more processing devices (e.g., baseband processors) to carry out various protocol and radio control functions. Baseband circuitry 610 may interface with application circuitry of architecture 600 (e.g., a combination of processor circuitry 602 and CRM 660) for generation and processing of baseband signals and for controlling operations of the RF circuitry 611 or 612. The baseband circuitry 610 may handle various radio control functions that enable communication with one or more radio networks via the RF circuitry 611 or 612. The baseband circuitry 610 may include circuitry such as, but not limited to, one or more single-core or multi-core processors (e.g., one or more baseband processors) or control logic to process baseband signals received from a receive signal path of the RF circuitry 611 and/or 612, and to generate baseband signals to be provided to the RF circuitry 611 or 612 via a transmit signal path. In various embodiments, the baseband circuitry 610 may implement a real-time OS (RTOS) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 6, in one embodiment, the baseband circuitry 610 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the communication circuitry 609 is a cellular radiofrequency communication system, such as millimeter wave (mmWave) communication circuitry or some other suitable cellular communication circuitry. In the first example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the communication circuitry 609 is WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 610 and/or RF circuitry 611 and 612. The baseband circuitry 610 may also support radio communications for more than one wireless protocol.

Continuing with the aforementioned embodiment, the baseband circuitry 610 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions, etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 609 also includes RF circuitry 611 and 612 to enable communication with wireless networks using modulated electromagnetic radiation through a non-solid medium. Each of the RF circuitry 611 and 612 include a receive signal path, which may include circuitry to convert analog RF signals (e.g., an existing or received modulated waveform) into digital baseband signals to be provided to the baseband circuitry 610. Each of the RF circuitry 611 and 612 also include a transmit signal path, which may include circuitry configured to convert digital baseband signals provided by the baseband circuitry 610 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 611 or 612 using metal transmission lines or the like.

The RF circuitry 611 (also referred to as a "mesh transceiver") is used for communications with other mesh or fog devices 664. The mesh transceiver 611 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 611, configured for a particular wireless communication protocol, may be used for the connections to the mesh devices 664. For example, a WLAN unit may be used to implement Wi-Fi™ communications in accordance with the IEEE 802.11 standard. In addition, wireless wide area communications, for example, according to a cellular or other wireless wide area protocol, may occur via a WWAN unit.

The mesh transceiver 611 may communicate using multiple standards or radios for communications at different ranges. For example, the architecture 600 may communicate with close/proximate devices, e.g., within about 10 meters, using a local transceiver based on BLE, or another low power radio, to save power. More distant mesh devices 664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 612 (also referred to as a "wireless network transceiver," a "cloud transceiver," or the like) may be included to communicate with devices or services in the cloud 601 via local or wide area network protocols. The wireless network transceiver 612 includes one or more radios to communicate with devices in the cloud 601. The cloud 601 may be the same or similar to cloud 302 discussed previously. The wireless network transceiver 612 may be a LPWA transceiver that follows the IEEE 802.15.4, or IEEE 802.15.4g standards, among others, such as those discussed herein. The architecture 600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 611 and wireless network transceiver 612, as described herein. For example, the radio transceivers 611 and 612 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The transceivers 611 and 612 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, I600.11a, etc.) WiFi-direct, ANT/ANT+, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 611, 612 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry/controller (NIC) 616 may be included to provide wired communication to the cloud 601 or to other devices, such as the mesh devices 664 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the architecture 600 via NIC 616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 616 may include one or more dedicated processors and/or FPGAs to communicate using one or more of the aforementioned network interface protocols. In some implementations, the NIC 616 may include multiple controllers to provide connectivity to other networks using the same or different protocols. For example, the architecture 600 may include a first NIC 616 providing communications to the cloud over Ethernet and a second NIC 616 providing communications to other devices over another type of network.

The interconnect 606 may couple the processor circuitry 602 to an external interface 618 (also referred to as "I/O interface circuitry" or the like) that is used to connect external devices or subsystems. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. The external devices include, inter alia, sensor circuitry 621, EMCs 622, and positioning circuitry 645.

The sensor circuitry 621 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 618 connects the architecture 600 to electro-mechanical devices (EMCs) 624, allow architecture 600 to change its state, position, and/or orientation, or move or control a mechanism or system. Each of the EMCs 622 comprise a mechanical device for moving or controlling a mechanism or system (e.g., the architecture 600), and converts energy (e.g., electric current or moving air and/or liquid) into some kind of motion. The EMCs 622 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, architecture 600 may be configured to operate one or more EMCs 622 based on one or more captured events and/or instructions or control signals received from a service provider and/or various client systems. In some embodiments, the sensor circuitry 621 and EMCs 622 may correspond to the sensors 2028 discussed with regard to FIG. 20.

The positioning circuitry 645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the communication circuitry 609 to communicate with the nodes and components of the positioning network. The positioning circuitry 645 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the architecture 600, which are referred to as input device circuitry 686 and output device circuitry 684 in FIG. 6. The input device circuitry 686 and output device circuitry 684 include one or more user interfaces designed to enable user interaction with the architecture 600 and/or peripheral component interfaces designed to enable peripheral component interaction with the architecture 600. Input device circuitry 686 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 684 may be included to show information or otherwise convey information, such as sensor readings, actuator position(s), or other like information. Data and/or graphics may be displayed on one or more user interface components of the output device circuitry 684. Output device circuitry 684 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the architecture 600. The output device circuitry 684 may also include speakers or other audio emitting devices, printer(s), and/or the like. In some embodiments, the sensor circuitry 621 may be used as the input device circuitry 686 (e.g., an image capture device, motion capture device, or the like) and one or more EMCs 622 may be used as the output device circuitry 684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 624 may be coupled to the architecture 600 to power the architecture 600, which may be used in embodiments where the architecture 600 is not in a fixed location. The battery 624 may be a lithium ion battery, a lead-acid automotive battery, or a metal-air battery, such as a zinc-air battery, an aluminum-air battery, a lithium-air battery, a lithium polymer battery, and/or the like. In embodiments where the architecture 600 is mounted in a fixed location, the architecture 600 may have a power supply coupled to an electrical grid. In these embodiments, the architecture 600 may include power tee circuitry to provide for electrical power drawn from a network cable to provide both power supply and data connectivity to the architecture 600 using a single cable.

Power management integrated circuitry (PMIC) 626 may be included in the architecture 600 to track the state of charge (SoCh) of the battery 624, and to control charging of the architecture 600. The PMIC 626 may be used to monitor other parameters of the battery 624 to provide failure predictions, such as the state of health (SoH) and the state of function (SoF) of the battery 624. The PMIC 626 may include voltage regulators, surge protectors, power alarm detection circuitry. The power alarm detection circuitry may detect one or more of brown out (under-voltage) and surge (over-voltage) conditions. The PMIC 626 may communicate the information on the battery 624 to the processor circuitry 602 over the interconnect 606. The PMIC 626 may also include an analog-to-digital (ADC) convertor that allows the processor circuitry 602 to directly monitor the voltage of the battery 624 or the current flow from the battery 624. The battery parameters may be used to determine actions that the architecture 600 may perform, such as transmission frequency, mesh network operation, sensing frequency, and the like. As an example, the PMIC 626 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 628, or other power supply coupled to a grid, may be coupled with the PMIC 626 to charge the battery 624. In some examples, the power block 628 may be replaced with a wireless power receiver to obtain the power wirelessly, for example, through a loop antenna in the architecture 600. A wireless battery charging circuit, such as an LTC4020 chip from Linear Technologies of Milpitas, Calif., among others, may be included in the PMIC 626. The specific charging circuits chosen depend on the size of the battery 624, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

III. Example System Overview

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 8 and 9.

Figure 8:
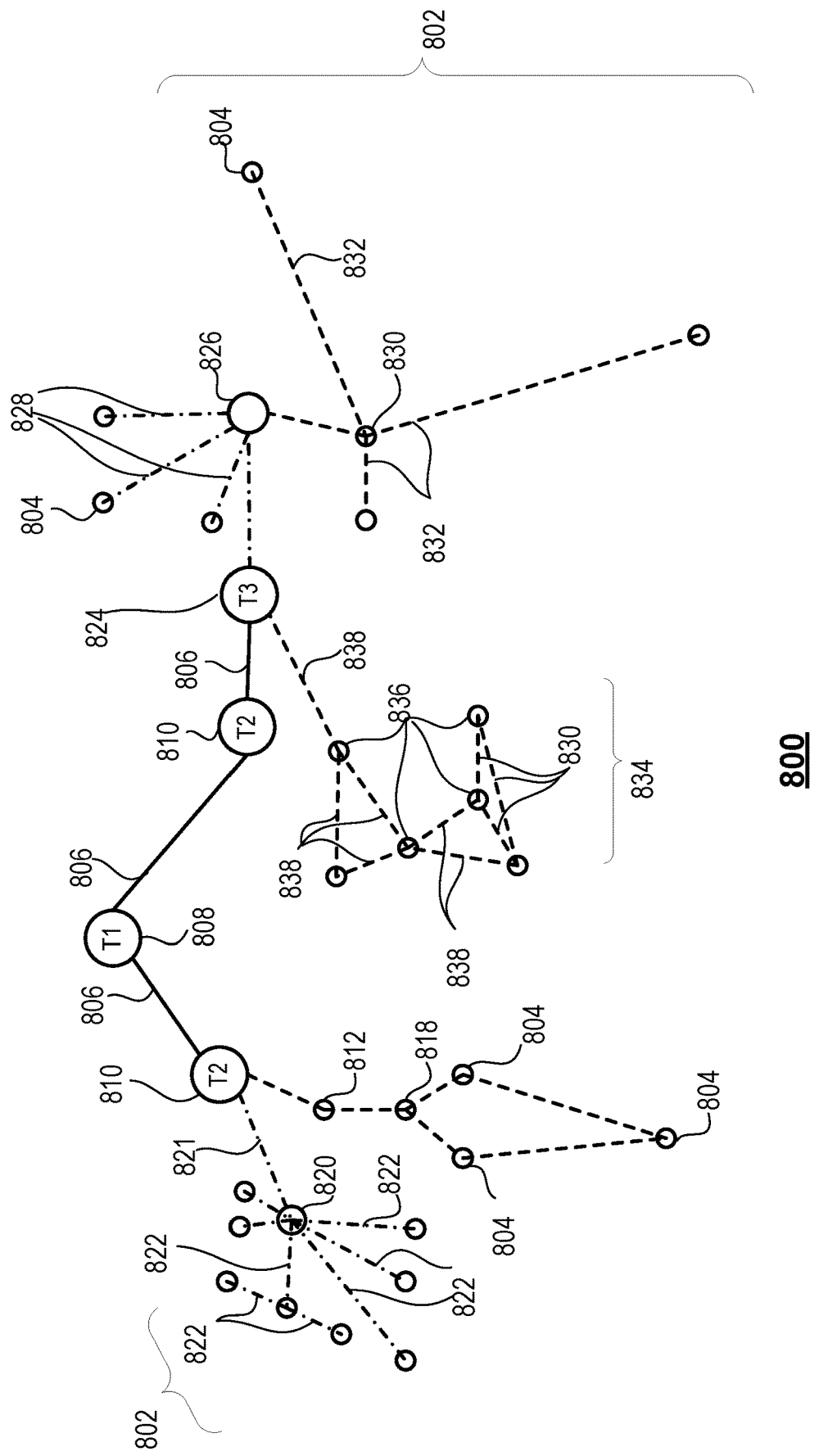
FIG. 8 illustrates an arrangement showing interconnections that may be present between a network and Internet of Things (IoT) networks, in accordance with various embodiments.
Figure 9:
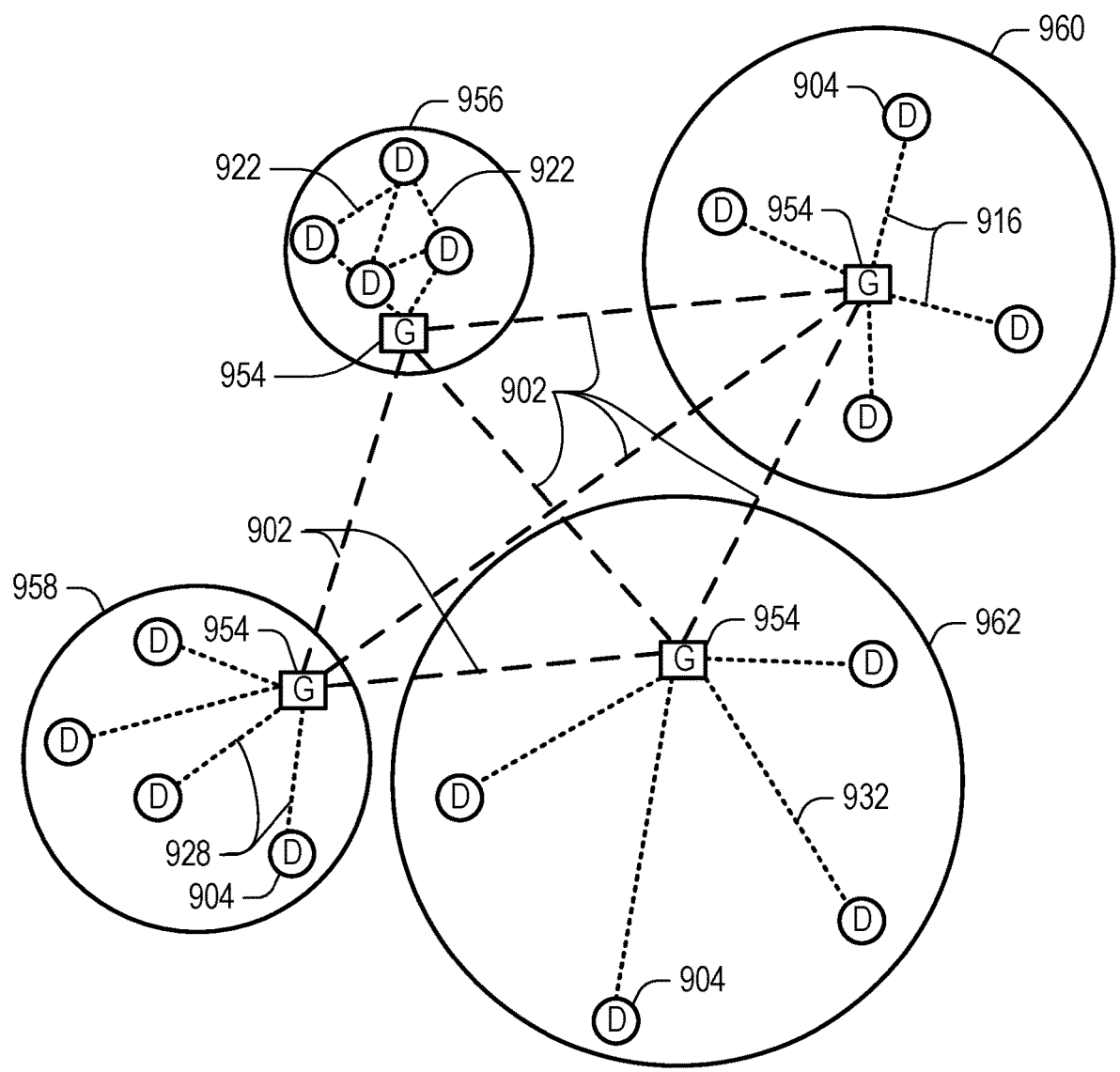
FIG. 9 illustrates an example domain topology, in accordance with various embodiments.

FIG. 8 illustrates an arrangement 800 showing interconnections that may be present between the Internet and IoT networks, in accordance with various embodiments. The interconnections may couple smaller networks 802, down to the individual IoT device 804, to the fiber backbone 806 of the Internet 800. To simplify the drawing, not every device 804, or other object, is labeled.

In FIG. 8, top-level providers, which may be termed tier 1 providers 808, are coupled by the fiber backbone of the Internet to other providers, such as secondary or tier 2 providers 810. In one example, a tier 2 provider 810 may couple to a tower 812 of an LTE cellular network, for example, by further fiber links, by microwave communications 814, or by other communications technologies. The tower 812 may couple to a mesh network including IoT devices 804 through an LTE communication link 816, for example, through a central node 818. The communications between the individual IoT devices 804 may also be based on LTE or NR communication links 816. In another example, a high-speed uplink 820 may couple a tier 2 provider 810 to a gateway (GW) 820. A number of IoT devices 804 may communicate with the GW 820, and with each other through the GW 820, for example, over BLE links 822.

The fiber backbone 806 may couple lower levels of service providers to the Internet, such as tier 3 providers 824. A tier 3 provider 824 may be considered a general Internet service provider (ISP), for example, purchasing access to the fiber backbone 810 from a tier 2 provider 810 and providing access to a corporate GW 826 and other customers. From the corporate GW 826, a wireless local area network (WLAN) can be used to communicate with IoT devices 804 through Wi-Fi® links 828. A Wi-Fi link 828 may also be used to couple to a low power wide area (LPWA) GW 830, which can communicate with IoT devices 804 over LPWA links 832, for example, compatible with the LoRaWan specification promulgated by the LoRa alliance.

The tier 3 provider 824 may also provide access to a mesh network 834 through a coordinator device 836 that communicates with the tier 3 provider 824 using any number of communications links, such as an LTE cellular link, an LPWA link, or a link 838 based on the IEEE 802.15.4 standard, such as Zigbee®. Other coordinator devices 836 may provide a chain of links that forms cluster tree of linked devices.

IoT devices 804 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 804 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 804 may be biotic devices such as monitoring implants, biosensors, biochips, and the like. In other embodiments, an IoT device 804 may be a computer device that is embedded in a computer system and coupled with communications circuitry of the computer system. In such embodiments, the IoT device 804 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 804 may include one or more memory devices and one or more processors to capture and store/record data. Each of the IoT devices 804 may include appropriate communications circuitry (e.g., transceiver(s), modem, antenna elements, etc.) to communicate (e.g., transmit and receive) captured and stored/recorded data. Further, each IoT device 804 may include other transceivers for communications using additional protocols and frequencies. The wireless communications protocols may be any suitable set of standardized rules or instructions implemented by the IoT devices 804 to communicate with other devices, including instructions for packetizing/depacketizing data, instructions for modulating/demodulating signals, instructions for implementation of protocols stacks, and the like. For example, IoT devices 804 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 804, tower 812, GW 820, 826, and 830, coordinator device 836, and so forth, may also be incorporated with the embodiments described herein, in particular, with references to FIGS. 1-7. In particular, the IoT devices 804, tower 812, GW 820, 826, and 830, coordinator device 836, and so forth, may correspond with the resources 104 and/or observed resources 230 discussed previously with regard to FIGS. 1-2.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 9 illustrates an example domain topology 900 that may be used for a number of IoT networks coupled through backbone links 902 to GWs 954, in accordance with various embodiments. To simplify the drawing, not every device 904, or communications link 916, 922, 928, or 932 is labeled. The backbone links 902 may include any number of wired or wireless technologies, and may be part of a local area network (LAN), a wide area network (WAN), or the Internet. Similar to FIG. 8, in embodiments, one or more of IoT devices 904 (which may be the same or similar as IoT devices 804 of FIG. 8), GWs 954, and so forth, may be incorporated with embodiments described herein. In particular, the various devices shown by FIG. 9 may correspond with the resources 104 and/or observed resource(s) 230 discussed previously with regard to FIGS. 1-2.

The network topology 900 may include any number of types of IoT networks, such as a mesh network 956 using BLE links 922. Other IoT networks that may be present include a WLAN network 958 using WiFi links 928, a cellular network 960 using cellular links 916, and an LPWA network 962 using LPWA links 932. Each of these IoT networks may provide opportunities for new developments, as described herein. For example, communications between IoT devices 904, such as over the backbone links 902, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 906 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 958 uses systems that perform standards conversion to provide multi-standard connectivity, enabling IoT devices 904 using different protocols to communicate. Further systems may provide seamless interconnectivity across a multi-standard infrastructure comprising visible Internet resources and hidden Internet resources. Communications in the cellular network 960 may be enhanced by systems that offload data, extend communications to more remote devices, or both. The LPWA network 962 may include systems that perform non-Internet protocol (IP) to IP interconnections, addressing, and routing.

Figure 10:
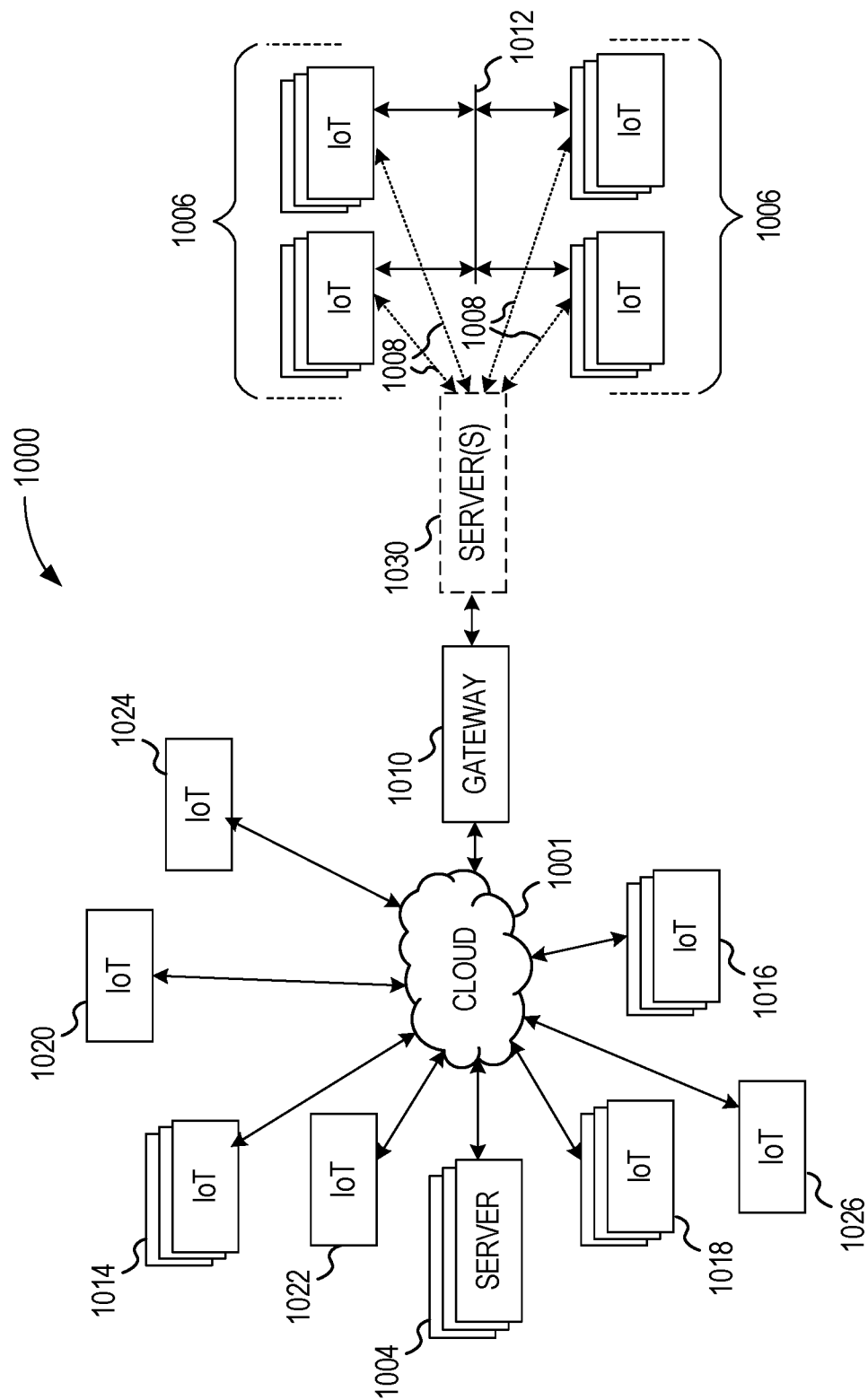
FIG. 10 illustrates an example cloud computing network or cloud in communication with a number of IoT devices, in accordance with various embodiments.

FIG. 10 illustrates an arrangement 1000 of example cloud computing network, or cloud 1001, in communication with a number of Internet of Things (IoT) devices, in accordance with various embodiments. The cloud 1001 may represent the Internet, one or more cellular networks, a local area network (LAN) or a wide area network (WAN) including proprietary and/or enterprise networks for a company or organization, or combinations thereof. Cloud 1001 may correspond to cloud 601 of FIG. 16. Components used for such communications system can depend at least in part upon the type of network and/or environment selected. Protocols and components for communicating via such networks are well known and will not be discussed herein in detail. However, it should be appreciated that cloud 1001 may be associated with network operator who owns or controls equipment and other elements necessary to provide network-related services, such as one or more base stations or access points, and one or more servers for routing digital data or telephone calls (for example, a core network or backbone network).

The IoT devices in FIG. 10 may be the same or similar to the IoT devices 804 discussed with regard to FIGS. 8-9. In particular, the IoT devices in FIG. 10 may correspond with the resources 104 and/or observed resource(s) 230 discussed previously with regard to FIGS. 1-2. The IoT devices may include any number of different types of devices, grouped in various combinations, such as IoT group 1006 that may include IoT devices that provide one or more services for a particular user, customer, organizations, etc. A service provider may deploy the IoT devices in the IoT group 1006 to a particular area (e.g., a geolocation, building, etc.) in order to provide the one or more services. In one example, the IoT group 306 may be a traffic control group where the IoT devices in the IoT group 1006 may include stoplights, traffic flow monitors, cameras, weather sensors, and the like, to provide traffic control and traffic analytics services for a particular municipality or other like entity. Similar to FIGS. 8-9, in embodiments, one or more of IoT devices 1014-1024, GW 1010, and so forth, may be incorporated with the various embodiments described herein, in particular, with references to FIGS. 1-16. For example, in some embodiments, the IoT group 1006, or any of the IoT groups discussed herein, may include the components, devices, systems discussed with regard to FIGS. 1-16.

The IoT group 1006, or other subgroups, may be in communication with the cloud 1001 through wireless links 1008, such as LPWA links, and the like. Further, a wired or wireless sub-network 1012 may allow the IoT devices to communicate with each other, such as through a local area network, a wireless local area network, and the like. The IoT devices may use another device, such as a GW 1010 to communicate with the cloud 1001. Other groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, or both.

As can be seen from FIG. 10, a large number of IoT devices may be communicating through the cloud 1001. This may allow different IoT devices to request or provide information to other devices autonomously. For example, the IoT group 1006 may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

In another example, the IoT group 1006 may be an industrial control group (also referred to as a "connected factory", an "industry 4.0" group, and the like) where the IoT devices in the IoT group 1006 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1006 may communicate with the servers 1004 via GW 1010 and cloud 1001 to provide captured data, which may be used to provide performance monitoring and analytics to the manufacturer or factory operator. Additionally, the IoT devices in the IoT group 1006 may communicate among each other, and/or with other IoT devices of other IoT groups, to make decisions on their own and to perform their tasks as autonomously as possible.

Clusters of IoT devices, such as the IoT groups depicted by FIG. 10, may be equipped to communicate with other IoT devices as well as with the cloud 1001. This may allow the IoT devices to form an ad-hoc network between the devices, allowing them to function as a single device, which may be termed a fog device. This is discussed further with respect to FIG. 20.

Figure 11:
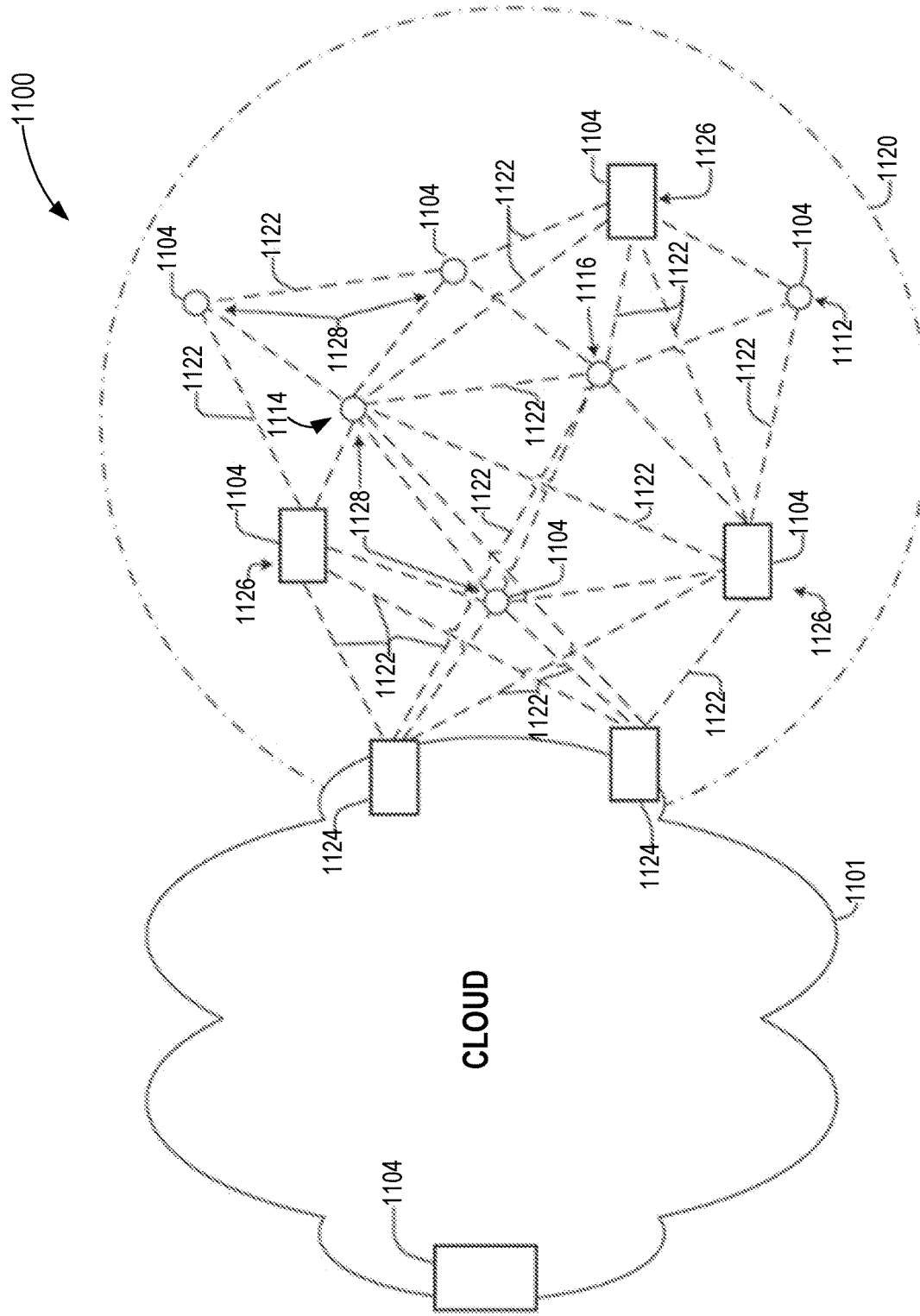
FIG. 11 illustrates an arrangement of a cloud computing network or cloud in communication with a mesh network of IoT devices or IoT fog, in accordance with various embodiments.

FIG. 11 illustrates an arrangement 1100 of a cloud computing network, or cloud 1101, in communication with a mesh network of IoT devices, which may be termed a fog device 1120 or fog 1120, operating at the edge of the cloud 1101, in accordance with various embodiments. Cloud 1101 may be the same or similar to cloud 601 of FIG. 6 and cloud 1001 of FIG. 10. In this example, the fog 1120 is a group of IoT devices at an intersection (e.g., and may include one or more IoT groups 306 of FIG. 3). The fog 1120 may be established in accordance with specifications released by the OpenFog Consortium (OFC), the Open Connectivity Foundation™ (OCF), among others. In some embodiments, the fog 1120 may be a tangle as defined by the IOTA foundation. Additionally, each of the IoT devices in the fog 1120 are Fog/Edge Nodes that correspond with the resources 104 and/or observed resource(s) 230 discussed previously with regard to FIGS. 1-2.

In embodiments, fog computing systems, such as fog 1120, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1101 to Things (e.g., IoT devices 1104).

Fog computing systems may be used to perform low-latency computation/aggregation on the data while routing it to a central cloud computing service for performing heavy computations or computationally burdensome tasks. On the other hand, edge cloud computing consolidates human-operated, voluntary resources such as desktop PCs, tablets, smartphones, nano data centers as a cloud. In various implementations, resources in the edge cloud may be in one to two-hop proximity to the IoT devices 1104, which may result in reducing overhead related to processing data and may reduce network delay.

In some embodiments, the fog 1120 may be a consolidation of IoT devices 1104 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, Fog resources reside farther from the edge of the network when compared to edge systems but closer than a central cloud infrastructure. Fog devices are used to effectively handle computationally intensive tasks offloaded by edge resources.

In embodiments, the fog 1120 may operate at the edge of the cloud 1101. In some embodiments, the fog 1120 operating at the edge of the cloud 1101 may overlap or be subsumed into an edge network of the cloud 1101. In embodiments, the edge network of the cloud 1101 may overlap with the fog 1120, or become a part of the fog 1120. Furthermore, the fog 1120 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as those discussed herein.

Data may be captured, stored/recorded, and communicated among the IoT devices 1104. Analysis of the traffic flow and control schemes may be implemented by aggregators 1126 that are in communication with the IoT devices 1104 and each other through a mesh network. The aggregators 1126 may be a type of IoT device 404 and/or network appliance. Data may be uploaded to the cloud 1101, and commands received from the cloud 1101, through GWs 1124 that are in communication with the IoT devices 1104 and the aggregators 1126 through the mesh network. Unlike the traditional cloud computing model, in some implementations, the cloud 1101 may have little or no computational capabilities and only serves as a repository for archiving data recorded and processed by the fog 1120. In these implementations, the cloud 1101 centralized data storage system and provides reliability and access to data by the computing resources in the fog 1120 and/or edge devices. Being at the core of the architecture, the Data Store of the cloud 1101 is accessible by both Edge and Fog layers of the aforementioned edge-fog network.

Similar to FIGS. 8-10, in embodiments, one or more of IoT devices 1104, aggregators 1126, and so forth, may be incorporated with the various embodiments described herein, in particular, with references to FIGS. 1-7. For example, in some embodiments, the fog 1120, or any of grouping of devices discussed herein, may include the one or more components, devices systems, etc. discussed, such as the resources 104 discussed with regard to FIGS. 1-7.

Any number of communications links may be used in the fog 1120. Shorter-range links 1122, for example, compatible with IEEE 802.15.4 may provide local communications between IoT devices that are proximate to one another or other devices. Longer-range links 1122, for example, compatible with LPWA standards, may provide communications between the IoT devices and the GWs 1124. To simplify the diagram, not every communications link 1122 is labeled with a reference number.

The fog 1120 may be considered to be a massively interconnected network wherein a number of IoT devices are in communications with each other, for example, by the communication links 1122. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1124. In these networks, the number of interconnections may provide substantial redundancy, allowing communications to be maintained, even with the loss of a number of IoT devices.

Not all of the IoT devices may be permanent members of the fog 1120. In the example of FIG. 11, three transient IoT devices have joined the fog 1120, a first mobile device 1112, a second mobile device 1114, and a third mobile device 1116. The fog 1120 may be presented to clients in the cloud 1101, such as the server 1134, as a single device located at the edge of the cloud 1101. In this example, the control communications to specific resources in the fog 1120 may occur without identifying any specific IoT device 1104 within the fog 1120. Accordingly, if any IoT device 1104 fails, other IoT devices 1104 may be able to discover and control a resource. For example, the IoT devices 1104 may be wired so as to allow any one of the IoT devices 1104 to control measurements, inputs, outputs, etc., for the other IoT devices 1104. The aggregators 1126 may also provide redundancy in the control of the IoT devices 1104 and other functions of the fog 1120.

In some examples, the IoT devices may be configured using an imperative programming style, e.g., with each IoT device having a specific function and communication partners. However, the IoT devices forming the fog 1120 may be configured in a declarative programming style, allowing the IoT devices to reconfigure their operations and communications, such as to determine needed resources in response to conditions, queries, and device failures. This may be performed as transient IoT devices, such as the mobile devices 1112, 1114, 1116, join the fog 1120. As transient or mobile IoT devices enter or leave the fog 1120, the fog 1120 may reconfigure itself to include those devices. This may be performed by forming a temporary group of the mobile devices 1112 and 1114 and the third mobile device 1116 to control or otherwise communicate with the IoT devices 1104. If one or both of the devices 1112, 1114 are autonomous, the temporary group may provide instructions to the devices 1112, 1114. As the transient devices 1112, 1114, and 1116, leave the vicinity of the fog 1120, it may reconfigure itself to eliminate those IoT devices 1104 from the network. The fog 1120 may also divide itself into functional units, such as the IoT devices 1104 and other IoT devices proximate to a particular area or geographic feature, or other IoT devices that perform a particular function. This type of combination may enable the formation of larger IoT constructs using resources from the fog 1120.

As illustrated by the fog 1120, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data, and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Some non-limiting example as provided infra. The following examples pertain to further embodiments. Specifics in the examples may be used anywhere in one or more embodiments. All optional features of the apparatus(es) described herein may also be implemented with respect to a method or process.

Example 1 includes computing circuitry comprising: a neighbor observer arranged to generate situation information based on sensor data, wherein the sensor data is representative of an observed device relative to the computing circuitry; a neighbor authenticator arranged to generate context information to indicate a current context of the computing circuitry; and a trust level evaluator arranged to assign the observed device to a trust zone based on the situation information and the context information, and determine a trust level of the observed device based on the determined trust zone.

Example 2 includes the computing circuitry of example 1 and/or some other examples herein, further comprising: a trust manager coupled to the neighbor observer, the neighbor authenticator, and the trust level evaluator, wherein the trust manager is arranged to control the computing circuitry to perform an action based on the determined trust level.

Example 3 includes the computing circuitry of example 2 and/or some other examples herein, wherein, to assign the observed device to a trust zone, the trust level evaluator is arranged to: assign the observed device to a first trust zone when a first condition is satisfied; assign the observed device to a second trust zone when the first condition is satisfied and a second condition is satisfied; and assign the observed device to a third trust zone when the first condition is satisfied, the second condition is satisfied, and a third condition is satisfied, wherein: the first condition is satisfied when the situation information indicates that a position of the observed device relative to the computing circuitry is less than a threshold value, the second condition is satisfied when the context information indicates that a relationship exists between the computing circuitry and the observed device, and the third condition is satisfied when the context information indicates that an identity or device type of the observed device has been validated.

Example 4 includes the computing circuitry of example 3 and/or some other examples herein, wherein the trust manager is arranged to determine a current mode of operation of the computing circuitry, wherein the current mode of operation is one of a Fog/Edge mode of operation (FMO) or an analog mode of operation (AMO).

Example 5 includes the computing circuitry of example 4 and/or some other examples herein, wherein, when the current mode of operation is the FMO, the neighbor authenticator is arranged to: control receipt of authentication data and/or security credentials when the observed device joins a Fog or Edge Network cluster; attempt to authenticate the observed device using one or both of the authentication data and the security credentials; and generate the context information based on a result of the attempt to authenticate the observed device.

Example 6 includes the computing circuitry of example 5 and/or some other examples herein, wherein, when the current mode of operation is the FMO, to assign the observed device to a trust zone, the trust level evaluator is arranged to: assign the observed device to the first trust zone when only the situation information is available for the determination of the trust level; assign the observed device to the second trust zone when the situation information and the authentication data are available for the determination of the trust level; and assign the observed device to the third trust zone when the situation information, the authentication data, and the security information are available for the determination of the trust level.

Example 7 includes the computing circuitry of example 4 and/or some other examples herein, wherein, when the current mode of operation is the AMO, the neighbor authenticator is arranged to: attempt to authenticate the observed device using the situation information; and generate the context information based on a result of the attempt to authenticate the observed device.

Example 8 includes the computing circuitry of example 7 and/or some other examples herein, wherein, to attempt to authenticate the observed device using the situation information, the neighbor authenticator is arranged to: determine an approach of the observed device relative to the computing circuitry based on the situation information, wherein the determined approach is one of a direct approach, an indirect approach, and a glancing approach; determine a velocity of the approach based on the situation information; estimate an interaction that is to take place between the observed device and the computing circuitry based on empirical data; and determine an interaction type of the estimated interaction, wherein the interaction type is one of a deterministic interaction or a probabilistic interaction.

Example 9 includes the computing circuitry of example 8 and/or some other examples herein, wherein, when the current mode of operation is the AMO, to assign the observed device to a trust zone, the trust level evaluator is arranged to: assign the observed device to the first trust zone when the interaction type is a probabilistic interaction, the velocity is above a first threshold velocity, and the determined approach is a direct approach or an indirect approach; assign the observed device to the second trust zone the interaction type is a probabilistic interaction and one of: the velocity is above the first threshold velocity and the determined approach is a glancing approach, the velocity is below the first threshold velocity and above a second threshold velocity, and the determined approach is an indirect approach or a glancing approach, and the velocity is below the second threshold velocity and the determined approach is an indirect approach or a glancing approach; and assign the observed device to the third trust zone when the interaction type is a deterministic interaction regardless of the determined approach or the determined velocity.

Example 10 includes the computing circuitry of example 9 and/or some other examples herein, wherein: the direct interaction indicates that a movement direction of the computing circuitry is toward a position of the observed device, or that a movement direction of the observed device is toward a position of the computing circuitry; the indirect interaction indicates that the movement direction of the computing circuitry is skewed by a predefined magnitude from the position of the observed device, or that the movement direction of the observed device is skewed by a predefined magnitude from the position of the computing circuitry; and the glancing interaction indicates that the movement direction of the computing circuitry is toward a predetermined region surrounding the position of the observed device, or that the movement direction of the observed device is toward a predetermined region surrounding the position of the computing circuitry.

Example 11 includes the computing circuitry of example 9 and/or some other examples herein, wherein, when the current mode of operation is the AMO, the trust manager is arranged to: identify a policy stored by a policy manager of the computing circuitry, wherein the policy is to indicate one or more actions to be performed for a plurality of trust levels; and determine the action to be one or more actions defined by the policy corresponding to the trust level assigned to the observed device.

Example 12 includes the computing circuitry of example 2 and/or some other examples herein, wherein the trust manager is arranged to: poll the neighbor observer for the situation information on a periodic basis; poll the neighbor authenticator for the context information on the periodic basis; and provide, to the trust level evaluator, the situation information obtained from the neighbor observer and the context information obtained from the neighbor authenticator.

Example 13 includes the computing circuitry of example 12 and/or some other examples herein, wherein the trust manager is arranged to: obtain an indication of the assigned trust level of the observed device; and control storage, in a local cache, of the assigned trust level in association with an identifier of the observed device.

Example 14 includes the computing circuitry of examples 3-13 and/or some other examples herein, wherein, to determine the trust level of the observed device, the trust level evaluator is arranged to: determine a first trust level for the observed device when the observed device is assigned to the first trust zone; determine a second trust level for the observed device when the observed device is assigned to the second trust zone; and determine a third trust level for the observed device when the observed device is assigned to the third trust zone.

Example 15 includes the computing circuitry of example 14 and/or some other examples herein, wherein, to control the computing circuitry to perform the action based on the determined trust level, the trust manager is arranged to: provide, to the observed device, a first amount of service or access to the computing circuitry when the determined trust level is the first trust level; provide, to the observed device, a second amount of service or access to the computing circuitry when the determined trust level is the second trust level; and provide, to the observed device, a third amount of service or access to the computing circuitry when the determined trust level is the third trust level, and wherein the first amount is less than the second amount, and the second amount is less than the third amount.

Example 16 includes the computing circuitry of examples 1-15 and/or some other examples herein, wherein the situation information comprises one or more of a position of the observed device relative to the computing circuitry, a movement direction of the computing circuitry with respect to the observed device, a movement direction of the observed device with respect to the computing circuitry, a velocity of the observed device, a rate of acceleration of the observed device, and an altitude of the observed device.

Example 17 includes the computing circuitry of examples 1-16 and/or some other examples herein, wherein the computing circuitry comprises processor circuitry communicatively coupled with memory circuitry, and wherein the neighbor observer, the neighbor authenticator, the trust level evaluator, and the trust manager are implemented as individual artificial intelligence (AI) agents stored by the memory circuitry, wherein the individual AI agents are to be executed by individual processing devices of the processor circuitry.

Example 18 includes the computing circuitry of examples 1-17 and/or some other examples herein, wherein the computing circuitry is a field-programmable gate array (FPGA) comprising a plurality of configurable logic blocks (CLBs), and wherein the neighbor observer, the neighbor authenticator, the trust level evaluator, and the trust manager are implemented as individual logical units loaded into corresponding ones of the plurality of CLBs.

Example 19 includes the computing circuitry of examples 1-18 and/or some other examples herein, wherein the current context of the computing circuitry is based in part on whether a relationship exists between the computing circuitry and the observed device.

Example 20 includes the computing circuitry of examples 1-19 and/or some other examples herein, wherein the context information comprises a system context of the computing circuitry to indicate the current context of the computing circuitry, wherein the system context includes information about a state of the computing circuitry, information about a state of individual components of the computing circuitry, information about a state of a logical environment of the computing circuitry, and/or information about a state of a physical location of the computing circuitry.

Example 21 includes one or more computer-readable media (CRM) comprising instructions, wherein execution of the instructions is to cause a computing device to: generate situation information that is representative of an observed resource; generate context information to indicate a current context of the computing device; assign the observed resource to a trust zone based on the situation information and the context information; determine a trust level of the observed resource based on the determined trust zone; and control the computing device to perform an action based on the determined trust level.

Example 22 includes the one or more CRM of example 21 and/or some other examples herein, wherein, to assign the observed resource to a trust zone, execution of the instructions is to cause a computing device to: assign the observed resource to a first trust zone when a first condition is satisfied; assign the observed resource to a second trust zone when the first condition is satisfied and a second condition is satisfied; and assign the observed resource to a third trust zone when the first condition is satisfied, the second condition is satisfied, and a third condition is satisfied, wherein: the first condition is satisfied when the situation information indicates that a position of the observed resource relative to the computing device is less than a threshold value, the second condition is satisfied when the context information indicates that a relationship exists between the computing device and the observed resource, and the third condition is satisfied when the context information indicates that an identity or device type of the observed resource has been validated.

Example 23 includes the one or more CRM of example 22 and/or some other examples herein, wherein execution of the instructions is to cause the computing device to: determine a current mode of operation of the computing device, wherein the current mode of operation is one of a Fog/Edge mode of operation (FMO) or an analog mode of operation (AMO).

Example 24 includes the one or more CRM of example 23 and/or some other examples herein, wherein, when the current mode of operation is the FMO, execution of the instructions is to cause the computing device to: control receipt of authentication data and/or security credentials when the observed resource joins a Fog or Edge Network cluster; attempt to authenticate the observed resource using one or both of the authentication data and the security credentials; and generate the context information based on a result of the attempt to authenticate the observed resource.

Example 25 includes the one or more CRM of example 24 and/or some other examples herein, wherein, when the current mode of operation is the FMO, to assign the observed resource to a trust zone, execution of the instructions is to cause the computing device to: assign the observed resource to the first trust zone when only the situation information is available for the determination of the trust level; assign the observed resource to the second trust zone when the situation information and the authentication data are available for the determination of the trust level; and assign the observed resource to the third trust zone when the situation information, the authentication data, and the security information are available for the determination of the trust level.

Example 26 includes the one or more CRM of example 23 and/or some other examples herein, wherein, when the current mode of operation is the AMO, execution of the instructions is to cause the computing device to: attempt to authenticate the observed resource using the situation information; and generate the context information based on a result of the attempt to authenticate the observed resource.

Example 27 includes the one or more CRM of example 26 and/or some other examples herein, wherein, to attempt to authenticate the observed resource using the situation information, execution of the instructions is to cause the computing device to: determine an approach of the observed resource relative to the computing device based on the situation information, wherein the determined approach is one of a direct approach, an indirect approach, and a glancing approach; determine a velocity of the approach based on the situation information; estimate an interaction that is to take place between the observed resource and the computing device based on empirical data; and determine an interaction type of the estimated interaction, wherein the interaction type is one of a deterministic interaction or a probabilistic interaction.

Example 28 includes the one or more CRM of example 27 and/or some other examples herein, wherein, when the current mode of operation is the AMO, to assign the observed resource to a trust zone, execution of the instructions is to cause the computing device to: assign the observed resource to the first trust zone when the interaction type is a probabilistic interaction, the velocity is above a first threshold velocity, and the determined approach is a direct approach or an indirect approach; assign the observed resource to the second trust zone the interaction type is a probabilistic interaction and one of: the velocity is above the first threshold velocity and the determined approach is a glancing approach, the velocity is below the first threshold velocity and above a second threshold velocity, and the determined approach is an indirect approach or a glancing approach, and the velocity is below the second threshold velocity and the determined approach is an indirect approach or a glancing approach; and assign the observed resource to the third trust zone when the interaction type is a deterministic interaction regardless of the determined approach or the determined velocity.

Example 29 includes the one or more CRM of example 28 and/or some other examples herein, wherein: the direct interaction indicates that a movement direction of the computing device is toward a position of the observed resource, or that a movement direction of the observed resource is toward a position of the computing device; the indirect interaction indicates that the movement direction of the computing device is skewed by a predefined magnitude from the position of the observed resource, or that the movement direction of the observed resource is skewed by a predefined magnitude from the position of the computing device; and the glancing interaction indicates that the movement direction of the computing device is toward a predetermined region surrounding the position of the observed resource, or that the movement direction of the observed resource is toward a predetermined region surrounding the position of the computing device.

Example 30 includes the one or more CRM of example 28 and/or some other examples herein, wherein, when the current mode of operation is the AMO, execution of the instructions is to cause the computing device to: identify a policy stored by a policy manager of the computing device, wherein the policy is to indicate one or more actions to be performed for a plurality of trust levels; and determine the action to be one or more actions defined by the policy corresponding to the trust level assigned to the observed resource.

Example 31 includes the one or more CRM of example 30 and/or some other examples herein, wherein execution of the instructions is to cause the computing device to: obtain an indication of the assigned trust level of the observed resource; and control storage, in a local cache, of the assigned trust level in association with an identifier of the observed resource.

Example 32 includes the one or more CRM of examples 21-31 and/or some other examples herein, wherein, to determine the trust level of the observed resource, execution of the instructions is to cause the computing device to: determine a first trust level for the observed resource when the observed resource is assigned to the first trust zone; determine a second trust level for the observed resource when the observed resource is assigned to the second trust zone; and determine a third trust level for the observed resource when the observed resource is assigned to the third trust zone.

Example 33 includes the one or more CRM of example 32 and/or some other examples herein, wherein, to control the computing device to perform the action based on the determined trust level, execution of the instructions is to cause the computing device to: provide, to the observed resource, a first amount of service or access to the computing device when the determined trust level is the first trust level; provide, to the observed resource, a second amount of service or access to the computing device when the determined trust level is the second trust level; and provide, to the observed resource, a third amount of service or access to the computing device when the determined trust level is the third trust level, and wherein the first amount is less than the second amount, and the second amount is less than the third amount.

Example 34 includes the one or more CRM of examples 21-33 and/or some other examples herein, wherein the situation information comprises one or more of a position of the observed resource relative to the computing device, a movement direction of the computing device with respect to the observed resource, a movement direction of the observed resource with respect to the computing device, a velocity of the observed resource, a rate of acceleration of the observed resource, and an altitude of the observed resource.

Example 35 includes the one or more CRM of examples 21-34 and/or some other examples herein, wherein the current context of the subject resource is based in part on whether a relationship exists between the subject resource and the observed resource.

Example 36 includes the one or more CRM of examples 21-35 and/or some other examples herein, wherein the context information comprises a system context of the subject resource to indicate the current context of the subject resource, wherein the system context includes information about a state of the subject resource, information about a state of individual components of the subject resource, information about a state of a logical environment of the subject resource, and/or information about a state of a physical location of the subject resource.

Example 37 includes the one or more CRM of examples 21-36 and/or some other examples herein, wherein the one or more CRM is/are communicatively coupled with one or more processors, wherein the one or more processors are to execute the instructions.

Example 38 includes the one or more CRM of examples 21-36 and/or some other examples herein, wherein the one or more CRM comprises one or more configurable logic blocks (CLBs) implemented in a field-programmable gate array (FPGA), wherein the instructions comprise individual logical units loaded into the one or more CLBs.

Example 39 includes the one or more CRM of examples 21-38 and/or some other examples herein, wherein the one or more CRM comprises non-transitory CRM or transitory signals.

Example 40 includes a System on Chip (SoC) comprising the one or more CRM of examples 21-39 and/or some other examples herein.

Example 41 includes a subject resource comprising: observation means for generating situation information that is representative of an observed resource relative to the subject resource; authentication means for generating context information to indicate a current context of the subject resource; and evaluation means for assigning the observed resource to a trust zone based on the situation information and the context information, and for determining a trust level of the observed resource based on the determined trust zone.

Example 42 includes the subject resource of example 41 and/or some other examples herein, further comprising: trust management means coupled to the observation means, the authentication means, and the evaluation means, wherein the trust management means is for controlling the subject resource to perform an action based on the determined trust level.

Example 43 includes the subject resource of example 42 and/or some other examples herein, wherein assigning the observed resource to a trust zone, the evaluation means is for: assigning the observed resource to a first trust zone when a first condition is satisfied; assigning the observed resource to a second trust zone when the first condition is satisfied and a second condition is satisfied; and assigning the observed resource to a third trust zone when the first condition is satisfied, the second condition is satisfied, and a third condition is satisfied, wherein: the first condition is satisfied when the situation information indicates that a position of the observed resource relative to the subject resource is less than a threshold value, the second condition is satisfied when the context information indicates that a relationship exists between the subject resource and the observed resource, and the third condition is satisfied when the context information indicates that an identity or device type of the observed resource has been validated.

Example 44 includes the subject resource of example 43 and/or some other examples herein, wherein the trust management means is for determining a current mode of operation of the subject resource, wherein the current mode of operation is one of a Fog/Edge mode of operation (FMO) or an analog mode of operation (AMO).

Example 45 includes the subject resource of example 44 and/or some other examples herein, wherein, when the current mode of operation is the FMO, the authentication means is for: receiving authentication data and/or security credentials when the observed resource joins a Fog or Edge Network cluster; attempting to authenticate the observed resource using one or both of the authentication data and the security credentials; and generating the context information based on a result of the attempt to authenticate the observed resource.

Example 46 includes the subject resource of example 45 and/or some other examples herein, wherein, when the current mode of operation is the FMO, to assign the observed resource to a trust zone, the evaluation means is for: assigning the observed resource to the first trust zone when only the situation information is available for the determination of the trust level; assigning the observed resource to the second trust zone when the situation information and the authentication data are available for the determination of the trust level; and assigning the observed resource to the third trust zone when the situation information, the authentication data, and the security information are available for the determination of the trust level.

Example 47 includes the subject resource of example 44 and/or some other examples herein, wherein, when the current mode of operation is the AMO, the authentication means is for: attempting to authenticate the observed resource using the situation information; and generating the context information based on a result of the attempt to authenticate the observed resource.

Example 48 includes the subject resource of example 47 and/or some other examples herein, wherein, to attempt to authenticate the observed resource using the situation information, the authentication means is for: determining an approach of the observed resource relative to the subject resource based on the situation information, wherein the determined approach is one of a direct approach, an indirect approach, and a glancing approach; determining a velocity of the approach based on the situation information; estimating an interaction that is to take place between the observed resource and the subject resource based on empirical data; and determining an interaction type of the estimated interaction, wherein the interaction type is one of a deterministic interaction or a probabilistic interaction.

Example 49 includes the subject resource of example 48 and/or some other examples herein, wherein, when the current mode of operation is the AMO, to assign the observed resource to a trust zone, the evaluation means is for: assigning the observed resource to the first trust zone when the interaction type is a probabilistic interaction, the velocity is above a first threshold velocity, and the determined approach is a direct approach or an indirect approach; assigning the observed resource to the second trust zone the interaction type is a probabilistic interaction and one of: the velocity is above the first threshold velocity and the determined approach is a glancing approach, the velocity is below the first threshold velocity and above a second threshold velocity, and the determined approach is an indirect approach or a glancing approach, and the velocity is below the second threshold velocity and the determined approach is an indirect approach or a glancing approach; and assigning the observed resource to the third trust zone when the interaction type is a deterministic interaction regardless of the determined approach or the determined velocity.

Example 50 includes the subject resource of example 49 and/or some other examples herein, wherein: the direct interaction indicates that a movement direction of the subject resource is toward a position of the observed resource, or that a movement direction of the observed resource is toward a position of the subject resource; the indirect interaction indicates that the movement direction of the subject resource is skewed by a predefined magnitude from the position of the observed resource, or that the movement direction of the observed resource is skewed by a predefined magnitude from the position of the subject resource; and the glancing interaction indicates that the movement direction of the subject resource is toward a predetermined region surrounding the position of the observed resource, or that the movement direction of the observed resource is toward a predetermined region surrounding the position of the subject resource.

Example 51 includes the subject resource of example 49 and/or some other examples herein, wherein, when the current mode of operation is the AMO, the trust management means is for: identifying a policy stored by a policy manager of the subject resource, wherein the policy is to indicate one or more actions to be performed for a plurality of trust levels; and determining the action to be one or more actions defined by the policy corresponding to the trust level assigned to the observed resource.

Example 52 includes the subject resource of example 42 and/or some other examples herein, wherein the trust management means is for: polling the observation means for the situation information on a periodic basis; polling the authentication means for the context information on the periodic basis; and providing, to the evaluation means, the situation information obtained from the observation means and the context information obtained from the authentication means.

Example 53 includes the subject resource of example 52 and/or some other examples herein, wherein the trust management means is for: obtaining an indication of the assigned trust level of the observed resource; and controlling storage, in a local cache, of the assigned trust level in association with an identifier of the observed resource.

Example 54 includes the subject resource of examples 41-53 and/or some other examples herein, wherein, to determine the trust level of the observed resource, the evaluation means is for: determining a first trust level for the observed resource when the observed resource is assigned to the first trust zone; determining a second trust level for the observed resource when the observed resource is assigned to the second trust zone; and determining a third trust level for the observed resource when the observed resource is assigned to the third trust zone.

Example 55 includes the subject resource of example 54 and/or some other examples herein, wherein, to control the subject resource to perform the action based on the determined trust level, the trust management means is for: providing, to the observed resource, a first amount of service or access to the subject resource when the determined trust level is the first trust level; providing, to the observed resource, a second amount of service or access to the subject resource when the determined trust level is the second trust level; and providing, to the observed resource, a third amount of service or access to the subject resource when the determined trust level is the third trust level, and wherein the first amount is less than the second amount, and the second amount is less than the third amount.

Example 56 includes the subject resource of examples 41-55 and/or some other examples herein, wherein the situation information comprises one or more of a position of the observed resource relative to the subject resource, a movement direction of the subject resource with respect to the observed resource, a movement direction of the observed resource with respect to the subject resource, a velocity of the observed resource, a rate of acceleration of the observed resource, and an altitude of the observed resource.

Example 57 includes the subject resource of examples 41-56 and/or some other examples herein, wherein the subject resource comprises processor circuitry communicatively coupled with memory circuitry, and wherein the observation means, the authentication means, the evaluation means, and the trust management means are implemented as individual software agents stored by the memory circuitry and executed by the processor circuitry.

Example 58 includes the subject resource of examples 41-57 and/or some other examples herein, wherein the subject resource is a field-programmable gate array (FPGA) comprising a plurality of configurable logic blocks (CLBs), and wherein the observation means, the authentication means, the evaluation means, and the trust management means are implemented as individual logical units loaded into corresponding ones of the plurality of CLBs.

Example 59 includes the subject resource of examples 41-58 and/or some other examples herein, wherein the current context of the subject resource is based in part on whether a relationship exists between the subject resource and the observed resource.

Example 60 includes the subject resource of examples 41-59 and/or some other examples herein, wherein the context information comprises a system context of the subject resource to indicate the current context of the subject resource, wherein the system context includes information about a state of the subject resource, information about a state of individual components of the subject resource, information about a state of a logical environment of the subject resource, and/or information about a state of a physical location of the subject resource.

Example 61 includes a method to be performed by a subject resource comprising: generating or causing to generate situation information indicative of an observed resource relative to the subject resource; generating or causing to generate context information to indicate a current context of the subject resource; and assigning or causing to assign the observed resource to a trust zone based on the situation information and the context information; and determining or causing to determine a trust level of the observed resource based on the determined trust zone.

Example 62 includes the method of example 61 and/or some other examples herein, further comprising: controlling or causing to control the subject resource to perform an action based on the determined trust level.

Example 63 includes the method of example 62 and/or some other examples herein, wherein assigning the observed resource to a trust zone comprises: assigning or causing to assign the observed resource to a first trust zone when a first condition is satisfied; assigning or causing to assign the observed resource to a second trust zone when the first condition is satisfied and a second condition is satisfied; and assigning or causing to assign the observed resource to a third trust zone when the first condition is satisfied, the second condition is satisfied, and a third condition is satisfied, wherein: the first condition is satisfied when the situation information indicates that a position of the observed resource relative to the subject resource is less than a threshold value, the second condition is satisfied when the context information indicates that a relationship exists between the subject resource and the observed resource, and the third condition is satisfied when the context information indicates that an identity or device type of the observed resource has been validated.

Example 64 includes the method of example 63 and/or some other examples herein, further comprising: determining or causing to determine a current mode of operation of the subject resource, wherein the current mode of operation is one of a Fog/Edge mode of operation (FMO) or an analog mode of operation (AMO).

Example 65 includes the method of example 64 and/or some other examples herein, wherein, when the current mode of operation is the FMO, the method comprises: receiving or causing to receive authentication data and/or security credentials when the observed resource joins a Fog or Edge Network cluster; attempting or causing to attempt to authenticate the observed resource using one or both of the authentication data and the security credentials; and generating or causing to generate the context information based on a result of the attempt to authenticate the observed resource.

Example 66 includes the method of example 65 and/or some other examples herein, wherein, when the current mode of operation is the FMO, assigning the observed resource to a trust zone comprises: assigning or causing to assign the observed resource to the first trust zone when only the situation information is available for the determination of the trust level; assigning or causing to assign the observed resource to the second trust zone when the situation information and the authentication data are available for the determination of the trust level; and assigning or causing to assign the observed resource to the third trust zone when the situation information, the authentication data, and the security information are available for the determination of the trust level.

Example 67 includes the method of example 64 and/or some other examples herein, wherein, when the current mode of operation is the AMO, the method comprises: attempting or causing to attempt to authenticate the observed resource using the situation information; and generating or causing to generate the context information based on a result of the attempt to authenticate the observed resource.

Example 68 includes the method of example 67 and/or some other examples herein, wherein attempting to authenticate the observed resource using the situation information comprises: determining or causing to determine an approach of the observed resource relative to the subject resource based on the situation information, wherein the determined approach is one of a direct approach, an indirect approach, and a glancing approach; determining or causing to determine a velocity of the approach based on the situation information; estimating or causing to estimate an interaction that is to take place between the observed resource and the subject resource based on empirical data; and determining or causing to determine an interaction type of the estimated interaction, wherein the interaction type is one of a deterministic interaction or a probabilistic interaction.

Example 69 includes the method of example 68 and/or some other examples herein, wherein, when the current mode of operation is the AMO, to assign the observed resource to a trust zone comprises: assigning or causing to assign the observed resource to the first trust zone when the interaction type is a probabilistic interaction, the velocity is above a first threshold velocity, and the determined approach is a direct approach or an indirect approach; assigning or causing to assign the observed resource to the second trust zone the interaction type is a probabilistic interaction and one of: the velocity is above the first threshold velocity and the determined approach is a glancing approach, the velocity is below the first threshold velocity and above a second threshold velocity, and the determined approach is an indirect approach or a glancing approach, and the velocity is below the second threshold velocity and the determined approach is an indirect approach or a glancing approach; and assigning or causing to assign the observed resource to the third trust zone when the interaction type is a deterministic interaction regardless of the determined approach or the determined velocity.

Example 70 includes the method of example 69 and/or some other examples herein, wherein: the direct interaction indicates that a movement direction of the subject resource is toward a position of the observed resource, or that a movement direction of the observed resource is toward a position of the subject resource; the indirect interaction indicates that the movement direction of the subject resource is skewed by a predefined magnitude from the position of the observed resource, or that the movement direction of the observed resource is skewed by a predefined magnitude from the position of the subject resource; and the glancing interaction indicates that the movement direction of the subject resource is toward a predetermined region surrounding the position of the observed resource, or that the movement direction of the observed resource is toward a predetermined region surrounding the position of the subject resource.

Example 71 includes the method of example 69 and/or some other examples herein, wherein, when the current mode of operation is the AMO, the method comprises: identifying or causing to identify a policy stored by a policy manager of the subject resource, wherein the policy is to indicate one or more actions to be performed for a plurality of trust levels; and determining or causing to determine the action to be one or more actions defined by the policy corresponding to the trust level assigned to the observed resource.

Example 72 includes the method of example 62 and/or some other examples herein, further comprising: polling or causing to poll for the situation information on a periodic basis; and polling or causing to poll for the context information on the periodic basis.

Example 73 includes the method of example 72 and/or some other examples herein, further comprising: obtaining or causing to obtain an indication of the assigned trust level of the observed resource; and storing or causing to store the assigned trust level in association with an identifier of the observed resource in a local cache.

Example 74 includes the method of examples 61-73 and/or some other examples herein, wherein determining the trust level of the observed resource comprises: determining or causing to determine a first trust level for the observed resource when the observed resource is assigned to the first trust zone; determining or causing to determine a second trust level for the observed resource when the observed resource is assigned to the second trust zone; and determining or causing to determine a third trust level for the observed resource when the observed resource is assigned to the third trust zone.

Example 75 includes the method of example 74 and/or some other examples herein, wherein controlling the subject resource to perform the action based on the determined trust level comprises: providing or causing to provide, to the observed resource, a first amount of service or access to the subject resource when the determined trust level is the first trust level; providing or causing to provide, to the observed resource, a second amount of service or access to the subject resource when the determined trust level is the second trust level; and providing or causing to provide, to the observed resource, a third amount of service or access to the subject resource when the determined trust level is the third trust level, and wherein the first amount is less than the second amount, and the second amount is less than the third amount.

Example 76 includes the method of examples 61-75 and/or some other examples herein, wherein the situation information comprises one or more of a position of the observed resource relative to the subject resource, a movement direction of the subject resource with respect to the observed resource, a movement direction of the observed resource with respect to the subject resource, a velocity of the observed resource, a rate of acceleration of the observed resource, and an altitude of the observed resource.

Example 77 includes the method of examples 61-76 and/or some other examples herein, wherein the current context of the subject resource is based in part on whether a relationship exists between the subject resource and the observed resource.

Example 78 includes the method of examples 61-77 and/or some other examples herein, wherein the context information comprises a system context of the subject resource to indicate the current context of the subject resource, wherein the system context includes information about a state of the subject resource, information about a state of individual components of the subject resource, information about a state of a logical environment of the subject resource, and/or information about a state of a physical location of the subject resource.

Example 79 includes an apparatus comprising means to perform one or more elements of a method described in or related to any of examples 1-78, or any other method or process described herein. Example 80 includes an apparatus comprising logic, modules, or circuitry to perform one or more elements of a method described in or related to any of examples 1-78, or any other method or process described herein. Example 81 includes a method, technique, or process as described in or related to any of examples 1-78, or portions or parts thereof. Example 82 includes an apparatus comprising: one or more processors and one or more computer readable media comprising instructions that, when executed by the one or more processors, cause the one or more processors to perform the method, techniques, or process as described in or related to any of examples 1-78, or portions thereof. Example 83 includes a signal as described in or related to any of examples 1-78, or portions or parts thereof. Example 84 includes a signal in a wireless network as shown and described herein. Example 85 includes a message, a datagram, a frame, a packet, and/or a protocol data unit (PDU) as described in or related to any of examples 1-78, or portions or parts thereof.

The foregoing description of one or more implementations provides illustration and description of various example embodiment, but is not intended to be exhaustive or to limit the scope of embodiments to the precise form disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. The description is thus to be regarded as illustrative instead of limiting.

What is claimed is:

1. Computing circuitry comprising:
  a neighbor observer arranged to generate situation information based on sensor data, wherein the sensor data is representative of an observed device relative to the computing circuitry;
  a neighbor authenticator arranged to:
    determine an approach of the observed device relative to the computing circuitry based on the situation information, the determined approach being indicative of a change in distance, angle, and speed of the observed device with respect to the computing circuitry or a change in distance, angle, and speed of the computing circuitry with respect to the observed device, and generate context information based at least in part on the determined approach, the context information to indicate a current context of the computing circuitry, and the current context of the computing circuitry is based in part on whether a relationship exists between the computing circuitry and the observed device; and a trust level evaluator arranged to:
assign the observed device to a trust zone based on potential interactions with the observed device according to the situation information and the context information and based on an amount of and type of information collected prior to interacting with the observed device, and determine a trust level of the observed device based on the determined trust zone.

2. The computing circuitry of claim 1, further comprising:
a trust manager coupled to the neighbor observer, the neighbor authenticator, and the trust level evaluator, wherein the trust manager is arranged to control the computing circuitry to perform an action based on the determined trust level.

3. The computing circuitry of claim 2, wherein, to assign the observed device to a trust zone, the trust level evaluator is arranged to:
assign the observed device to a first trust zone when a first condition is satisfied;
assign the observed device to a second trust zone when the first condition is satisfied and a second condition is satisfied; and
assign the observed device to a third trust zone when the first condition is satisfied, the second condition is satisfied, and a third condition is satisfied, wherein:
the first condition is satisfied when the situation information indicates that a position of the observed device relative to the computing circuitry is less than a threshold value,
the second condition is satisfied when the context information indicates that a relationship exists between the computing circuitry and the observed device, and
the third condition is satisfied when the context information indicates that an identity or device type of the observed device has been validated.

4. The computing circuitry of claim 3, wherein the trust manager is arranged to determine a current mode of operation of the computing circuitry, wherein the current mode of operation is one of a Fog/Edge mode of operation (FMO) or an analog mode of operation (AMO).

5. The computing circuitry of claim 4, wherein, when the current mode of operation is the FMO, the neighbor authenticator is arranged to:
control receipt of authentication data and/or security credentials when the observed device joins a Fog or Edge Network cluster; and
attempt to authenticate the observed device using one or both of the authentication data and the security credentials; and
generate the context information based on a result of the attempt to authenticate the observed device.

6. The computing circuitry of claim 5, wherein, when the current mode of operation is the FMO, to assign the observed device to a trust zone, the trust level evaluator is arranged to:
assign the observed device to the first trust zone when only the situation information is available for the determination of the trust level;
assign the observed device to the second trust zone when the situation information and the authentication data are available for the determination of the trust level; and
assign the observed device to the third trust zone when the situation information, the authentication data, and the security credentials are available for the determination of the trust level.

7. The computing circuitry of claim 4, wherein, when the current mode of operation is the AMO, the neighbor authenticator is arranged to:
attempt to authenticate the observed device using the situation information; and
generate the context information based on a result of the attempt to authenticate the observed device.

8. The computing circuitry of claim 3, wherein, to determine the trust level of the observed device, the trust level evaluator is arranged to:
determine a first trust level for the observed device when the observed device is assigned to the first trust zone;
determine a second trust level for the observed device when the observed device is assigned to the second trust zone; and
determine a third trust level for the observed device when the observed device is assigned to the third trust zone.

9. The computing circuitry of claim 8, wherein, to control the computing circuitry to perform the action based on the determined trust level, the trust manager is arranged to:
provide, to the observed device, a first amount of service or access to the computing circuitry when the determined trust level is the first trust level;
provide, to the observed device, a second amount of service or access to the computing circuitry when the determined trust level is the second trust level; and
provide, to the observed device, a third amount of service or access to the computing circuitry when the determined trust level is the third trust level, and
wherein the first amount is less than the second amount, and the second amount is less than the third amount.

10. The computing circuitry of claim 2, wherein the trust manager is arranged to:
poll the neighbor observer for the situation information on a periodic basis;
poll the neighbor authenticator for the context information on the periodic basis; and
provide, to the trust level evaluator, the situation information obtained from the neighbor observer and the context information obtained from the neighbor authenticator.

11. The computing circuitry of claim 10, wherein the trust manager is arranged to:
obtain an indication of the assigned trust level of the observed device; and
control storage, in a local cache, of the assigned trust level in association with an identifier of the observed device.

12. The computing circuitry of claim 2, wherein the computing circuitry comprises processor circuitry communicatively coupled with memory circuitry, and wherein the neighbor observer, the neighbor authenticator, the trust level evaluator, and the trust manager are implemented as individual artificial intelligence (AI) agents stored by the memory circuitry, wherein the individual AI agents are to be executed by individual processing devices of the processor circuitry.

13. The computing circuitry of claim 2, wherein the computing circuitry is a field-programmable gate array (FPGA) comprising a plurality of configurable logic blocks (CLBs), and wherein the neighbor observer, the neighbor authenticator, the trust level evaluator, and the trust manager are implemented as individual logical units loaded into corresponding ones of the plurality of CLBs.

14. The computing circuitry of claim 1, wherein:
the situation information comprises one or more of a position of the observed device relative to the computing circuitry, a movement direction of the computing circuitry with respect to the observed device, a movement direction of the observed device with respect to the computing circuitry, a velocity of the observed device, a rate of acceleration of the observed device, and an altitude of the observed device, and
the context information comprises a system context of the computing circuitry to indicate the current context of the computing circuitry, wherein the system context includes information about a state of the computing circuitry, information about a state of individual components of the computing circuitry, information about a state of a logical environment of the computing circuitry, and/or information about a state of a physical location of the computing circuitry.

15. Computing circuitry, comprising:
a neighbor observer arranged to generate situation information based on sensor data, wherein the sensor data is representative of an observed device relative to the computing circuitry;
a trust manager arranged to:
determine a current mode of operation of the computing circuitry, wherein the current mode of operation is one of a Fog/Edge mode of operation (FMO) or an analog mode of operation (AMO), and
control the computing circuitry to perform an action based on a determined trust level; and
a neighbor authenticator arranged to:
attempt to authenticate the observed device using the situation information when the current mode of operation is the AMO, and
generate context information based on a result of the attempt to authenticate the observed device, and further based on a result of the attempt to authenticate the observed device when the current mode of operation is the AMO, the context information to indicate a current context of the computing circuitry, and the current context of the computing circuitry is based in part on whether a relationship exists between the computing circuitry and the observed device, and
wherein, to attempt to authenticate the observed device using the situation information, the neighbor authenticator is arranged to:
determine an approach of the observed device relative to the computing circuitry based on the situation information to be one of a direct approach, an indirect approach, and a glancing approach;
determine a velocity of the approach based on the situation information;
estimate an interaction that is to take place between the observed device and the computing circuitry based on empirical data; and
determine an interaction type of the estimated interaction, wherein the interaction type is one of a deterministic interaction or a probabilistic interaction.

16. The computing circuitry of claim 15, further comprising at trust level evaluator arranged to assign the observed device to a trust zone, wherein, when the current mode of operation is the AMO, to assign the observed device to a trust zone, the trust level evaluator is arranged to:
assign the observed device to a first trust zone when the interaction type is a probabilistic interaction, the velocity is above a first threshold velocity, and the determined approach is a direct approach or an indirect approach;
assign the observed device to a second trust zone when the interaction type is a probabilistic interaction and one of:
the velocity is above the first threshold velocity and the determined approach is a glancing approach,
the velocity is below the first threshold velocity and above a second threshold velocity, and the determined approach is an indirect approach or a glancing approach, and
the velocity is below the second threshold velocity and the determined approach is an indirect approach or a glancing approach; and
assign the observed device to a third trust zone when the interaction type is a deterministic interaction regardless of the determined approach or the determined velocity.

17. The computing circuitry of claim 16, wherein:
the direct approach indicates that a movement direction of the computing circuitry is toward a position of the observed device, or that a movement direction of the observed device is toward a position of the computing circuitry;
the indirect approach indicates that the movement direction of the computing circuitry is skewed by a predefined magnitude from the position of the observed device, or that the movement direction of the observed device is skewed by a predefined magnitude from the position of the computing circuitry; and
the glancing approach indicates that the movement direction of the computing circuitry is toward a predetermined region surrounding the position of the observed device, or that the movement direction of the observed device is toward a predetermined region surrounding the position of the computing circuitry.

18. The computing circuitry of claim 16, wherein, when the current mode of operation is the AMO, the trust manager is arranged to:
identify a policy stored by a policy manager of the computing circuitry, wherein the policy is to indicate one or more actions to be performed for a plurality of trust levels; and
determine the action to be one or more actions defined by the policy corresponding to the trust level assigned to the observed device.

19. One or more non-transitory computer-readable media (NTCRM) comprising instructions, wherein execution of the instructions is to cause a computing device to:
generate situation information that is representative of an observed resource;
determine an approach of the observed resource relative to the computing device based on the situation information, the determined approach being indicative of a change in distance, angle, and speed of the observed resource with respect to the computing device or a change in distance, angle, and speed of the computing device with respect to the observed resource;

determine an interaction type of a predicted interaction between the observed resource and the computing device based at least in part on the determined approach;
generate context information based at least in part on the determined interaction type, the context information to indicate a current context of the computing device;
assign the observed resource to a trust zone based on potential interactions with the observed resource according to the situation information and the context information and based on an amount of and type of information collected prior to interacting with the observed device;
determine a trust level of the observed resource based on the determined trust zone; and
control the computing device to perform an action based on the determined trust level.

20. The one or more NTCRM of claim 19, wherein, to assign the observed resource to a trust zone, execution of the instructions is to cause a computing device to:
assign the observed resource to a first trust zone when a first condition is satisfied;
assign the observed resource to a second trust zone when the first condition is satisfied and a second condition is satisfied; and
assign the observed resource to a third trust zone when the first condition is satisfied, the second condition is satisfied, and a third condition is satisfied,
wherein the first condition is satisfied when the situation information indicates that a position of the observed resource relative to the computing device is less than a threshold value, the second condition is satisfied when the context information indicates that a relationship exists between the computing device and the observed resource, and the third condition is satisfied when the context information indicates that an identity or device type of the observed resource has been validated.

21. The one or more NTCRM of claim 20, wherein execution of the instructions is to cause the computing device to:
determine a current mode of operation of the computing device, wherein the current mode of operation is one of a Fog/Edge mode of operation (FMO) or an analog mode of operation (AMO).

22. The one or more NTCRM of claim 21, wherein, when the current mode of operation is the FMO, execution of the instructions is to cause the computing device to:
control receipt of authentication data and/or security credentials when the observed resource joins a Fog or Edge Network cluster;
attempt to authenticate the observed resource using one or both of the authentication data and the security credentials; and
generate the context information based on a result of the attempt to authenticate the observed resource.

23. The one or more NTCRM of claim 22, wherein, when the current mode of operation is the FMO, to assign the observed resource to a trust zone, execution of the instructions is to cause the computing device to:
assign the observed resource to the first trust zone when only the situation information is available for the determination of the trust level;
assign the observed resource to the second trust zone when the situation information and the authentication data are available for the determination of the trust level; and
assign the observed resource to the third trust zone when the situation information, the authentication data, and the security credentials are available for the determination of the trust level.

24. The one or more NTCRM of claim 21, wherein, when the current mode of operation is the AMO, execution of the instructions is to cause the computing device to:
attempt to authenticate the observed resource using the situation information; and
generate the context information based on a result of the attempt to authenticate the observed resource.

25. The one or more NTCRM of claim 20, wherein, to determine the trust level of the observed resource, execution of the instructions is to cause the computing device to:
determine a first trust level for the observed resource when the observed resource is assigned to the first trust zone;
determine a second trust level for the observed resource when the observed resource is assigned to the second trust zone; and
determine a third trust level for the observed resource when the observed resource is assigned to the third trust zone, and
wherein, to control the computing device to perform the action based on the determined trust level, execution of the instructions is to cause the computing device to:
provide, to the observed resource, a first amount of service or access to the computing device when the determined trust level is the first trust level;
provide, to the observed resource, a second amount of service or access to the computing device when the determined trust level is the second trust level; and
provide, to the observed resource, a third amount of service or access to the computing device when the determined trust level is the third trust level, and
wherein the first amount is less than the second amount, and the second amount is less than the third amount.

26. One or more non-transitory computer-readable media (NTCRM) comprising instructions, wherein execution of the instructions is to cause a computing device to:
determine a current mode of operation of the computing device, wherein the current mode of operation is one of a Fog/Edge mode of operation (FMO) or an analog mode of operation (AMO);
generate situation information that is representative of an observed resource;
attempt to authenticate the observed resource using the situation information when the current mode of operation is the AMO;
determine an interaction type of a predicted interaction between the observed resource and the computing device;
generate context information based at least in part on the determined interaction type, and when the current mode of operation is the AMO, further based on a result of the attempt to authenticate the observed resource, the context information indicating a current context of the computing device;
assign the observed resource to a trust zone based on the situation information and the context information;
determine a trust level of the observed resource based on the determined trust zone; and
control the computing device to perform an action based on the determined trust level, and
wherein, to attempt to authenticate the observed resource using the situation information, execution of the instructions is to cause the computing device to:

determine an approach of the observed resource relative to the computing device based on the situation information, wherein the determined approach is one of a direct approach, an indirect approach, and a glancing approach;

determine a velocity of the approach based on the situation information;

estimate the predicted interaction that is to take place between the observed resource and the computing device based on empirical data; and determine the interaction type of the predicted interaction based on the estimation, wherein the interaction type is one of a deterministic interaction or a probabilistic interaction.

27. The one or more NTCRM of claim 26, wherein, when the current mode of operation is the AMO, to assign the observed resource to a trust zone, execution of the instructions is to cause the computing device to:

assign the observed resource to a first trust zone when the interaction type is a probabilistic interaction, the velocity is above a first threshold velocity, and the determined approach is a direct approach or an indirect approach;

assign the observed resource to a second trust zone when the interaction type is a probabilistic interaction and one of: the velocity is above the first threshold velocity and the determined approach is a glancing approach, the velocity is below the first threshold velocity and above a second threshold velocity, and the determined approach is an indirect approach or a glancing approach, and the velocity is below the second threshold velocity and the determined approach is an indirect approach or a glancing approach; and assign the observed resource to a third trust zone when the interaction type is a deterministic interaction regardless of the determined approach or the determined velocity.

28. The one or more NTCRM of claim 27, wherein:

the direct approach indicates that a movement direction of the computing device is toward a position of the observed resource, or that a movement direction of the observed resource is toward a position of the computing device;

the indirect approach indicates that the movement direction of the computing device is skewed by a predefined magnitude from the position of the observed resource, or that the movement direction of the observed resource is skewed by a predefined magnitude from the position of the computing device; and the glancing approach indicates that the movement direction of the computing device is toward a predetermined region surrounding the position of the observed resource, or that the movement direction of the observed resource is toward a predetermined region surrounding the position of the computing device.

29. The one or more NTCRM of claim 27, wherein, when the current mode of operation is the AMO, execution of the instructions is to cause the computing device to:

identify a policy stored by a policy manager of the computing device, wherein the policy is to indicate one or more actions to be performed for a plurality of trust levels; and determine the action to be one or more actions defined by the policy corresponding to the trust level assigned to the observed resource.

30. The one or more NTCRM of claim 29, wherein execution of the instructions is to cause the computing device to:

obtain an indication of the assigned trust level of the observed resource; and control storage, in a local cache, of the assigned trust level in association with an identifier of the observed resource.

* * * * *

UNITED STATES PATENT AND TRADEMARK OFFICE
CERTIFICATE OF CORRECTION

PATENT NO. : 11,038,895 B2  
APPLICATION NO. : 16/147335  
DATED : June 15, 2021  
INVENTOR(S) : Katalin Bartfai-Walcott et al.

Page 1 of 1

It is certified that error appears in the above-identified patent and that said Letters Patent is hereby corrected as shown below:

In the Claims

Column 68
Line 5, "...at..." should read – "...a..."

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*